US009109049B2

(12) United States Patent
Kuzhiyil et al.

(10) Patent No.: US 9,109,049 B2
(45) Date of Patent: Aug. 18, 2015

(54) METHOD FOR PRETREATING LIGNOCELLULOSIC BIOMASS

(71) Applicant: Iowa State University Research Foundation, Inc., Ames, IA (US)

(72) Inventors: Najeeb M. Kuzhiyil, Ames, IA (US); Robert C. Brown, Ames, IA (US); Dustin Lee Dalluge, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 76 days.

(21) Appl. No.: 13/827,769

(22) Filed: Mar. 14, 2013

(65) Prior Publication Data

US 2013/0340746 A1    Dec. 26, 2013

Related U.S. Application Data

(60) Provisional application No. 61/662,610, filed on Jun. 21, 2012.

(51) Int. Cl.
| | | |
|---|---|---|
| *C09B 1/00* | (2006.01) | |
| *C08B 1/00* | (2006.01) | |
| *C08H 8/00* | (2010.01) | |
| *C10B 53/02* | (2006.01) | |
| *C10B 57/06* | (2006.01) | |

(52) U.S. Cl.
CPC .. *C08B 1/00* (2013.01); *C08H 8/00* (2013.01); *C10B 53/02* (2013.01); *C10B 57/06* (2013.01); *Y02E 50/14* (2013.01)

(58) Field of Classification Search
CPC ....................................................... C08B 1/00
See application file for complete search history.

(56) References Cited

U.S. PATENT DOCUMENTS

| | | | |
|---|---|---|---|
| 2006/0188965 A1* | 8/2006 | Wyman et al. ................... | 435/72 |
| 2011/0067991 A1* | 3/2011 | Hornung et al. ................ | 201/32 |
| 2011/0245489 A1 | 10/2011 | Steele et al. | |

OTHER PUBLICATIONS

"The Pre-Treatment and Pyrolysis of Biomass for the Production of Liquids for Fuels and Speciality Chemicals" Robert Alexander Hague Doctoral Thesis; Aston University, Sep. 1998.*
Kuzhiyil et al., "Temperature Dependence of Levogucosan Yield From Acid Infused Biomass Fast Pyrolysis," American Chemical Society Fall Meeting 2011, Denver, CO (Aug. 11, 2011).
Dobele et al., "Pre-Treatment of Biomass with Phosphoric Acid Prior to Fast Pyrolysis a Promising Method for Obtaining 1,6-anhydrosaccharides in High Yields," J. Anal. Appl. Pyrolysis 68-69:197-211 (2003).
Dobele et al., "Application of Catalysts for Obtaining 1,6-anhydrosaccharides from Cellulose and Wood by Fast Pyrolysis," J. Anal. Appl. Pyrolysis 74:401-405 (2005).
Kuzhiyil et al., "Pyrolytic Sugars from Cellulosic Biomass," ChemSusChem 5:2228-2236 (2012).
Scott et al., "Pretreatment of Poplar Wood for Fast Pyrolysis: Rate of Cation Removal," J. Anal. Appl. Pyrolysis 57:169-176 (2000).
Shafizadeh et al., "Production of Levoglucosan and Glucose from Pyrolysis of Cellulosic Materials," J. Appl. Polym. Sci. 23:3525-3539 (1979).
Kuzhiyil et al., "Temperature Dependence of Levoglucosan Yield from Fast Pyrolysis of Acid Infused Biomass," Abstract, American Chemical Society Fall Meeting 2011, Denver, CO (Aug. 31, 2011).
Kuzhiyil et al., "Recovery of Large Amounts of Levoglucosan Produced by the Fast Pyrolysis of Acid Infused Biomass," The American Institute of Chemical Engineers 2011 Annual Meeting, Minneapolis, MN (Oct. 18, 2011).
Brown, "Pyrolytic Pathways to Advanced Biofuels," The American Institute of Chemical Engineers 2011 Annual Meeting, Minneapolis, MN (Oct. 16-21, 2011).
Brown, "Pyrolysis Energy Systems," The American Society of Mechanical Engineers 2011 International Mechanical Engineering Congress & Exposition, Denver, CO (Nov. 16, 2011).
Brown, "Prospects for a Thermolytic Sugars Platform," The Thermochemical Convention of Biomass 2011 Conference, Chicago, IL (Sep. 27-30, 2011).
Dalluge et al.,"Pyrolytic Pathways to Increasing the Lignin-Derived Monomer/Oligomer Ratio in Bio-Oil Its all About the Alkali!," The Thermochemical Convention of Biomass 2011 Conference, Chicago, IL (Sep. 27-30, 2011).
Brown, "Thermal Depolymerization to Monomers: A New Approach to Pyrolysis," Symposium on the Thermochemical Conversion of Biomass to Fuels, Oklahoma State University, Stillwater, OK (Aug. 2, 2011).
Kuzhiyil et al., "Biomass Pretreatment to Improve Bio-Oil Stability," Poster, The TCS 2010 Symposium on Thermal and Catalytic Sciences for Biofuels and Biobased Products, Iowa State University, Ames, IA (Sep. 21-23, 2010).
Brown, "A Systems Approach to Improving Bio-Oil Stability," The TCS 2010 Symposium on Thermal and Catalytic Sciences for Biofuels and Biobased Products, Iowa State University, Ames, IA (Sep. 21-23, 2010).
Kuzhiyil, "Biomass Pretreatment to Improve Bio-Oil Stability," Abstract, The TCS 2010 Symposium on Thermal and Catalytic Sciences for Biofuels and Biobased Products, Iowa State University, Ames, IA (Sep. 21-23, 2010).
Brown, "A Systems Approach to Improving Bio-Oil Stability," Abstract, The TCS 2010 Symposium on Thermal and Catalytic Sciences for Biofuels and Biobased Products, Iowa State University, Ames, IA (Sep. 21-23, 2010).

* cited by examiner

*Primary Examiner* — Melvin C Mayes
*Assistant Examiner* — Douglas Call
(74) *Attorney, Agent, or Firm* — LeClairRyan, a Professional Corporation

(57) ABSTRACT

The present invention relates to a method for pretreating lignocellulosic biomass containing alkali and/or alkaline earth metal (AAEM). The method comprises providing a lignocellulosic biomass containing AAEM; determining the amount of the AAEM present in the lignocellulosic biomass; identifying, based on said determining, the amount of a mineral acid sufficient to completely convert the AAEM in the lignocellulosic biomass to thermally-stable, catalytically-inert salts; and treating the lignocellulosic biomass with the identified amount of the mineral acid, wherein the treated lignocellulosic biomass contains thermally-stable, catalytically inert AAEM salts.

15 Claims, 17 Drawing Sheets

METHOD FOR PRETREATING LIGNOCELLULOSIC BIOMASS

This application claims the benefit of U.S. Provisional Patent Application Ser. No. 61/662,610, filed Jun. 21, 2012, which is hereby incorporated by reference in its entirety.

This invention was made with government support under grant number DE-FG36-08-GO18205 awarded by United States Department of Energy. The government has certain rights in this invention.

FIELD OF THE INVENTION

The present invention relates to a method for pretreating lignocellulosic biomass containing alkali and/or alkaline earth metal (AAEM) with a predetermined amount of mineral acid to convert the AAEM to thermally-stable, catalytically-inert salts, thus obtaining bio-oil with a high sugar yield through subsequent pyrolysis.

BACKGROUND OF THE INVENTION

Cellulose, consisting of polymeric chains of glucose, is the most plentiful form of biomass in the world. If cost-effective methods are developed to depolymerize it, cellulosic biomass could become the basis for renewable fuels and commodity chemicals. To date, much of the research and development effort in advanced biofuels has focused on biological approaches that employ enzymes to hydrolyze cellulose to monosaccharides (Sun & Cheng, *Bioresource Technol.* 83:1 (2002); Dwivedi et al., *Energy for Sustainable Development* 13:174 (2009)). Commonly overlooked are thermal processes for producing water soluble carbohydrates that is suitable for fermentation or catalytic upgrading.

Fast pyrolysis, i.e., rapid heating of pure cellulose in the absence of oxygen, results in glycosidic bond breaking, liberating anhydrosugars in a process referred to here as carbohydrate depolymerization. Pure cellulose readily depolymerizes during pyrolysis at temperatures ranging 350 to 600° C., yielding predominately 1,6-anhydro-beta-D-glucopyranose, commonly known as levoglucosan (LG), and other anhydrosugar derivatives of glucose (Patwardhan et al., *J. Anal. App. Pyrol.* 86:323 (2009); Sun & Cheng, *Bioresource Technol.* 83:1 (2002)). Levoglucosan yields from pure cellulose can be as high as 59 wt %.

However, anhydrosugar yield from fast pyrolysis of most naturally-occurring biomass is low due to the inherent alkali and alkaline earth metal (AAEM) content contained in biomass. The presence of AAEM catalyzes saccharide ring fragmentation during pyrolysis which is in competition with glycosidic bond breaking Naturally-occurring AAEMs found in biomass catalyze the pyrolytic decomposition of cellulose to yield a preponderance of light oxygenated compounds, such as formic acid and hydroxyacetaldehyde, rather than depolymerization to simple sugar (Patwardhan et al., *Bioresource Technol.* 101:4646 (2009); Dwivedi et al., *Energy for Sustainable Development* 13:174 (2009)).

Because AAEM salts are water soluble, washing biomass with water or dilute acid has been proposed as a pretreatment of biomass to remove AAEMs and increase LG yields upon pyrolysis (Das et al., *Biomass Bioenerg.* 27:445 (2004); Fahmi et al., *Fuel* 87:1230 (2008); Brown et al., *Acs. Sym. Ser.* 784:123 (2001); Shafizadeh et al., *J. Appl. Polym. Sci.* 23:3525 (1979); Scott et al., *J. Anal. App. Pyrol.* 57:169 (2001); Ponder & Richards, *Biomass Bioenerg.* 7:1 (1994); Huber et al., *Chem. Rev.* 106:4044 (2006)). However, alkali metals are powerful catalysts during pyrolysis. If AAEMs are to be removed by washing, they must be substantially removed from the biomass to affect sugar yields. Such thorough washing and subsequent drying of the biomass prior to pyrolysis has been impractical or costly.

The present invention is directed to overcoming these and other deficiencies in the art.

SUMMARY OF THE INVENTION

One aspect of the present invention relates to a method for pretreating lignocellulosic biomass containing alkali and/or alkaline earth metal (AAEM). The method comprises the step of providing a lignocellulosic biomass containing AAEM. The amount of the AAEM present in the lignocellulosic biomass is determined and, based on said determining, the amount of a mineral acid sufficient to completely convert the AAEM in the lignocellulosic biomass to thermally-stable, catalytically-inert salts is identified. The lignocellulosic biomass is then treated with the identified amount of the mineral acid, wherein the treated lignocellulosic biomass contains thermally-stable, catalytically inert AAEM salts.

In accordance with the present invention, it has been discovered that it is possible to passivate AAEM using a simple pretreatment prior to pyrolysis. In a process referred to here as "passivation," the AAEM content of biomass is converted to a form that is no longer catalytically active. As a result, catalytic saccharide ring fragmentation is reduced, and the carbohydrate depolymerization pathway is favored, dramatically increasing the yield of anhydrosugars.

The method of the present invention employs a proteating process to titrate the AAEM in biomass with mineral acids, thus yielding thermally-stable salts that significantly reduce the catalytic activity of the AAEM. These salts formed by reacting AAEM cations with mineral acids not only can passivate AAEMs that normally catalyze fragmentation of pyranose rings, but also can form weak acids that buffer the system at pH levels that favor glycosidic bond breakage. Yields of sugar from the pretreated lignocellulosic biomass through the combination of pretreatment and pyrolysis are comparable to the yields of sugar from pure celluloses. This method provides a new pathway to produce sugars from biomass feedstocks using fast pyrolysis.

DETAILED DESCRIPTION OF THE INVENTION

Figure 1:
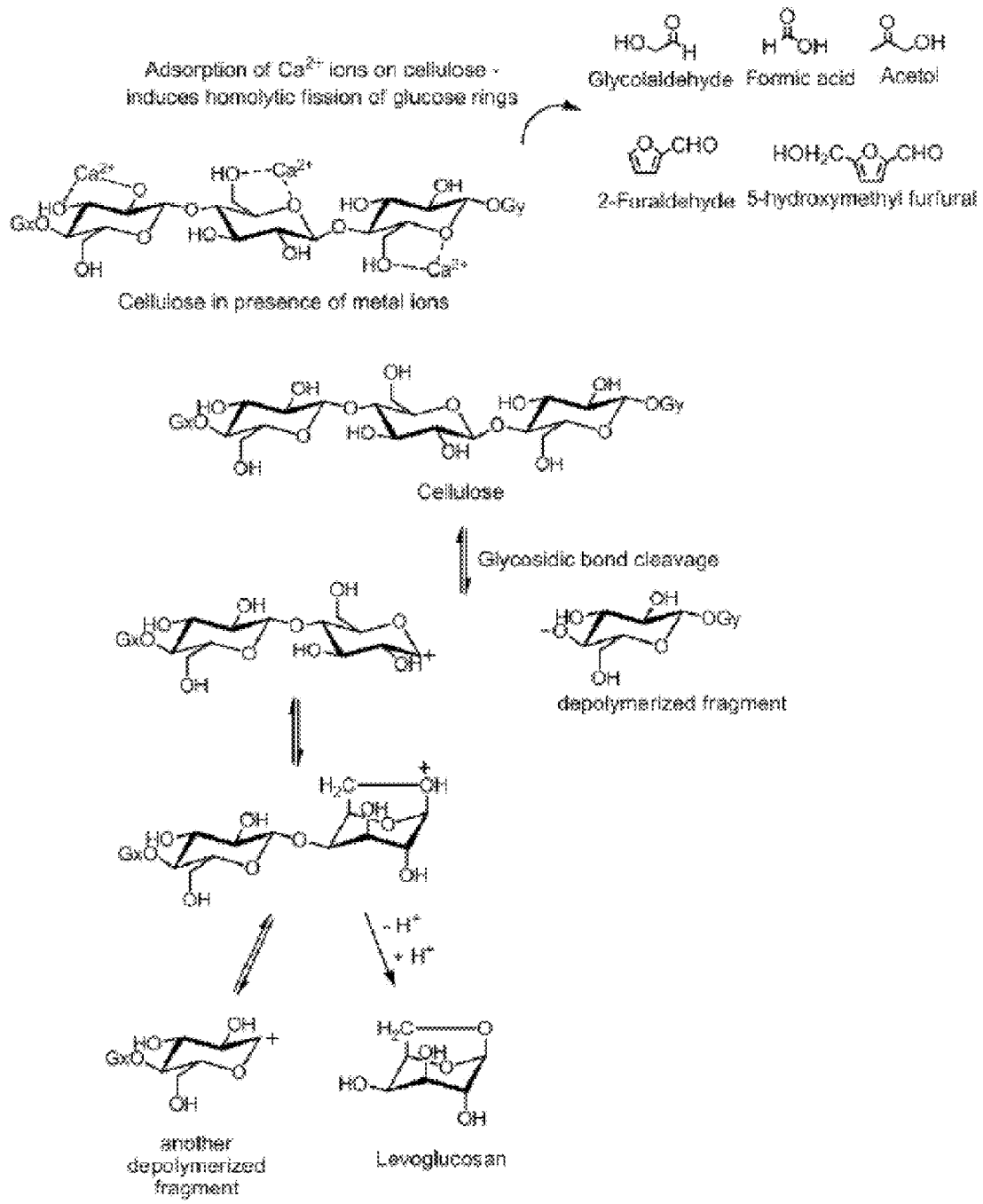
FIG. 1 is a schematic drawing showing the mechanism of cellulose pyrolysis (Patwardhan et al., *J. Anal. App. Pyrol.* 86:323 (2009); Yang et al., *Chem. Res. Chinese U.* 22:524 (2006); Ponder et al., *J. Anal. App. Pyrol.* 22:217 (1992), Sun & Cheng, *Bioresource Technol.* 83:1 (2002); Piskorz et al., *J. Anal. App. Pyrol.* 16:127 (1989); Dobele G, et al., *J. Anal. Appl. Pyrolysis* 74:401 (2005), which are hereby incorporated by reference in their entirety).

Biomass is biological material from living, or recently living organisms. Biomass can be in the form of products, by-products, and/or residues of the forestry and agriculture industries. Biomass includes, but is not limited to, forest and mill residues, agricultural crops and wastes, wood and wood wastes, animal wastes, livestock operation residues, aquatic plants, fast-growing trees and plants, and municipal and industrial wastes. Lignocellulosic biomass typically refers to plant biomass. Typically, lignocellulosic biomass can include cellulose, hemicelluose, and/or lignin.

Pyrolysis is the thermochemical decomposition of biomass at elevated temperatures in the absence of oxygen. The temperatures of pyrolysis are typically around 300 to 550° C. When treated at these temperatures, biomass decomposes to three primary products, namely, charcoal, bio-oil, and gases (e.g., CO, H2, CO2, and CH4). Fast pyrolysis, i.e., rapid heating of pure cellulose in the absence of oxygen, results in glycosidic bond breaking, liberating anhydrosugars in a process referred to here as carbohydrate depolymerization.

Sugars are excellent feedstocks for producing fuels and chemicals using fermentation and chemical catalytic technologies. Biomass is an abundant source of sugars as its cellulose and hemicellulose structural components are polymers of glucose. By depolymerizing cellulose and hemicellulose, anhydrosugars such as levoglucosan (LG) can be produced.

The existing techniques to produce sugars from biomass feedstocks typically use acid hydrolysis or enzymatic hydrolysis. These processes are very slow and require large amounts of acids and enzymes. On the other hand, fast pyrolysis is a very rapid process requiring only seconds of reaction time. Fast pyrolysis of pure cellulose yields mainly LG as the mechanism proceeds predominantly through the depolymerization pathway. However, the alkali and alkaline earth metals (AAEM) naturally contained in the raw biomass catalyzes fragmentation of the glucose rings during pyrolysis, which leads to a very low yield of LG and a high yield of light oxygenated compounds, such as hydroxyacetaldehyde and acetol. The AAEM can be removed by washing the biomass feedstock with water or dilute acid to obtain higher yield of sugars. However, to use the water- or dilute acid-washing method as an effective strategy, essentially all AAEMs must be removed. Washing and drying the biomass, however, would consume very large amounts of water and energy.

The method described herein, on the other hand, uses a chemical treatment to convert the naturally-occurring AAEM content in the biomass into a form that is no longer catalytically active. This method recognizes that the total amount of AAEM in biomass is relatively small, making this chemical treatment feasible and cost-effective. The method employs very modest amounts of acid, approximately equal to the molar quantity of AAEM in the biomass. Moreover, there is no waste acid disposal, because the acid is completely converted into thermally stable salts. The method allows for the thermal depolymerization of polysaccharides in biomass to sugars suitable for fermentation or catalytic upgrading.

Accordingly, one aspect of the present invention relates to a method for pretreating lignocellulosic biomass containing alkali and/or alkaline earth metals (AAEM). The method comprises the step of providing a lignocellulosic biomass containing AAEM. The amount of the AAEM present in the lignocellulosic biomass is determined and, based on said determining, the amount of a mineral acid sufficient to completely convert the AAEM in the lignocellulosic biomass to thermally-stable, catalytically-inert salts is identified. The lignocellulosic biomass is then treated with the identified amount of the mineral acid, wherein the treated lignocellulosic biomass contains thermally-stable, catalytically inert AAEM salts.

After the lignocellulosic biomass is pretreated, it is further pyrolyzed to obtain a bio-oil product with a high sugar yield. The pyrolysis process typically employs fast pyrolysis process. The sugar in the pyrolyzed bio-oil typically comprises anhydrosugars, monosaccharides, and oligosaccharides. The amount of oligosaccharides is typically less than the amounts of other sugars in the pyrolyzed bio-oil.

In principle, any type of lignocellulosic biomass can be pretreated according to the method of the present invention to obtain high-yield sugars through subsequent pyrolysis. For instance, the lignocellulosic biomass can be softwood, hardwood, grasses, crop residues, or mixtures thereof. Exemplary lignocellulosic biomass includes oak wood, switchgrass, corn stover, loblolly pine, etc.

The acid used to pretreat the lignocellulosic biomass is selected based on the criteria that the acid can react with the AAEM to form thermally-stable, catalytically inert salts, particularly at typical pyrolysis temperatures. Suitable acids are typically mineral acids. Exemplary mineral acids include sulfuric acid, phosphoric acid, or hydrochloric acid. These mineral acids, when infused into the lignocellulosic biomass, react with the AAEM and form large anions that prevent the AAEM from effectively reacting with plant carbohydrates. The resulting AAEM salts are thus stable at typical pyrolysis temperatures (i.e. 300-500° C.).

The amount of acid used to pretreat the lignocellulosic biomass varies depending on the type of acids used, the type of the lignocellulosic biomass being treated, and the amount of the AAEM contained in the raw lignocellulosic biomass. The amount of the acid used should substantially or completely convert the AAEM in the lignocellulosic biomass to thermally-stable, catalytically-inert salts, which then will not catalyze fragmentation of the glucose rings during pyrolysis. Thus, the amount of the acid used in the pretreatment is based on the amount of the AAEM present in the raw lignocellulosic biomass.

The amount of AAEM contained in a raw lignocellulosic biomass can vary depending on the type of the lignocellulosic biomass being treated. However, the amount of AAEM in biomass can be determined by various well known analytical methods, which then allows the biomass to be "titrated" with a known amount of a mineral acid to obtain the maximum yield of the anhydrosugar from subsequent pyrolysis of such biomass.

In an exemplary embodiment below, the technique to obtain very high yields of anhydrosugars from lignocellulosic biomass using fast pyrolysis is described in detail. Particularly, the mechanism and procedures of "titrating" the AAEM present in the lignocellulosic biomass to completely convert the AAEM in the lignocellulosic biomass to form thermally-stable AAEM salts are disclosed.

When raw bmass feedstocks, such as switchgrass and red oak, which contain naturally-occurring AAEMs, are subjected to fast pyrolysis, the yield of anhydrosugars (mainly levoglucosan, LG) is very low, compared to the potential sugar yield produced from the cellulose and hemicellulose contained in that feedstock (i.e., sugar yield from pure cellulose and hemicellulose). By using the method described here, very high yields of anhydrosugars can be obtained, as shown in Table 1.

TABLE 1

Average Range of Levoglucosan Yield from Untreated and Treated Biomass Feedstocks

| Feedstock | Levoglucosan Yield (wt %) | |
|---|---|---|
| | Untreated | Treated |
| Switchgrass | 2-3 | 10-15 |
| Corn Stover | 1-2 | 9-18 |
| Red Oak | 6-8 | 19-23 |
| Loblolly Pine | 4-6 | 18-23 |

The AAEMs contained in the biomass feedstocks catalyze ring fragmentation reactions during fast pyrolysis; the metal atoms form coordinate bonds with the oxygen atoms of the vicinal hydroxyl groups in the glycosidic ring thereby making the ring unstable. In the presence of the mineral acids, such as phosphoric and sulfuric acids, the AAEMs react to form salts of the respective acids that are less catalytically active. By titrating the AAEMs with an acid to form thermally stable AAEM salts, the reaction can be driven in the depolymerization route (the bond cleavage occurs at the glycosidic linkage) to yield predominantly sugars. FIG. 1 shows the mechanism of cellulose pyrolysis.

Figure 2:
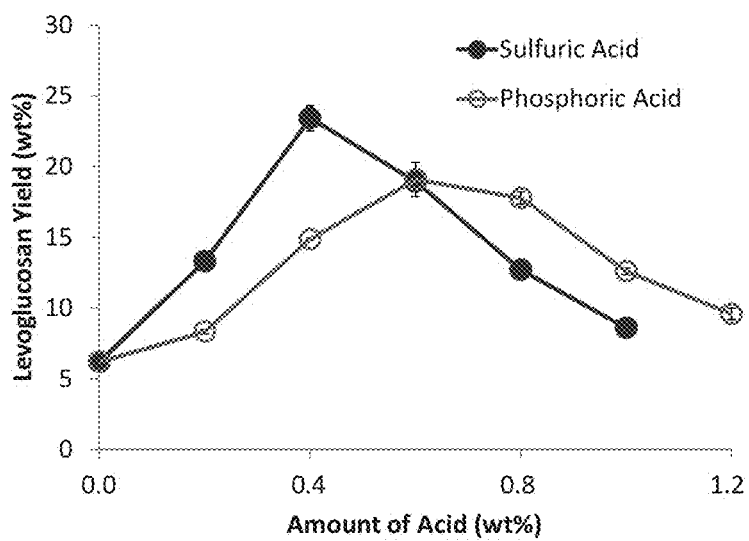
FIG. 2 is a graph showing the yield of LG from pyrolysis of red oak at 500° C. as a function of the amount of infused phosphoric and sulfuric acids.

The amount of acid needed to titrate the AAEMs in a particular type of biomass can be determined experimentally. In particular, the biomass can be infused with phosphoric and sulfuric acids at various concentrations and then subjected to analytical pyrolysis. The yield of LG generally increases significantly with the amount of the acid up to a maximum, and then decreases. The amount of the acid required to obtain the maximum tends to be different for different types of biomass. For example, as shown in FIG. 2, the maximum acid levels are 0.6 wt % and 0.4 wt % for phosphoric and sulfuric acids, respectively, for acid-infused red oak.

In one specific embodiment, the mineral acid used ranges from 0.04 to 0.50 mmol per gram of lignocellulosic biomass. The molar concentration of AAEM salts in the acid-pretreated lignocellulosic biomass ranges from 0.065 to 0.40 mmol per gram of lignocellulosic biomass.

The pretreated lignocellulosic biomass may be optionally dried prior to the pyrolysis step. The drying step may be carried out in an oven prior to pyrolysis. The drying temperature can be within a standard temperature range for drying a moistured biomass, for instance, at 50° C. Alternatively, the drying step can also take place during pyrolysis. Thus, the subsequent pyrolysis step can be performed with or without the drying step.

By this mineral-acid titration pretreatment, subsequent pyrolysis of the lignocellulosic biomass results in more cellulose being converted to sugar. Thus, the yield of sugar from pyrolysis of the pretreated lignocellulosic is greater than from pyrolysis of a lignocellulosic biomass that is not subjected to the pretreatment. For instance, the yield of sugar from pyrolysis of the pretreated biomass can increase 2-9 fold compared to the yield of sugar produced from pyrolysis of the same lignocellulosic biomass which is not subjected to the pretreatment.

For instance, for a lignocellulosic biomass without such pretreatment, yields only 2-6 wt % sugar from the biomass;

whereas pyrolysis of the lignocellulosic biomass with the pretreatment can produce a bio-oil product having a sugar yield of 18-25 wt %.

On the other hand, pretreatment reduces the relative content of light oxygenated compound in a pyrolyzed lignocellulosic biomass. The bio-oil product produced from pyrolysis of the pretreated lignocellulosic biomass can have a light oxygenated compound yield that is decreased by 8-15 wt % compared to a bio-oil product made from a lignocellulosic biomass that is not subjected to the pretreatment. For instance, for a lignocellulosic biomass without such pretreatment, pyrolysis results in a bio-oil product having a light oxygenated compound yield of 16-19 wt %; whereas pyrolysis of the lignocellulosic biomass with the pretreatment can generate a bio-oil product having a light oxygenated compound yield of only 4-8 wt %.

Pyrolysis of the pretreated lignocellulosic biomass can be carried out in any pyrolyzer known to those skilled in the art, as long as anhydrosugars such as levoglucosoan can be removed rapidly through evaporation or similar processes. For instance, the pyrolyzer can be a continuous flow reactor, such as a continuous flow fluid bed reactor or a continuous flow auger reactor. A more detailed description of the pyrolyzer and process of fractionating and recovering bio-oil from pyrolysis of biomass can be found in U.S. Pat. No. 8,476,480, issued on Jul. 2, 2013, which is herein incorporated by reference in its entirety.

Pyrolysis of the pretreated lignocellulosic biomass can be carried out over a range of temperatures. Typical temperature for pyrolysis ranges from 300° C. to 500° C. Without being bound by theory, continuous flow pyrolyzers operating at 500° C. on samples on a large scale may yield a considerable amount of char from the acid-infused biomass. This may be overcome by operating the continuous flow reactor at a temperature range as low as 300-400° C. to allow significant quantities of LG to be recovered without charring of saccharide products. This will also promote volatilization of such products as LG.

In another embodiment of the present invention, the pyrolyzer is an auger-type reactor. The auger-type reactors may be suitable for pyrolysis of acid-infused pretreated biomass, because the char produced during pyrolysis can be physically moved out of such reactors along with the heat carrier. Fresh heat carrier can be mixed with the biomass feedstock. The pyrolyzed bio-oil product can comprise 15-30 wt % sugar.

With a combination of the acid pretreatment method described herein and the pyrolysis (e.g., continuous flow auger reactor), the sugar yield resulting from pyrolysis of the pretreated biomass can be as high as 18-25 wt % biomass; whereas the sugar yield from pyrolysis of a biomass without such pretreatment is only 2-6 wt % biomass.

The present invention may be further illustrated by reference to the following examples.

EXAMPLES

The following examples are intended to illustrate, but by no means are intended to limit, the scope of the present invention as set forth in the appended claims.

Example 1

Materials and Methods

Both woody biomass (red oak and loblolly pine) and herbaceous biomass (switchgrass and cornstover) were investigated Examples 1-6, which provided a wide range of naturally occurring alkali and alkaline earth metals (AAEM) concentrations. Typically, woody biomass contains less than 500 ppm of AAEM, while herbaceous biomass can contain more than ten times this amount of AAEM.

Example 2

Determination of Structural Composition of Biomass

The structural composition of biomass was determined by extracting the cell wall of biomass and analyzing the content of cellulose, hemicellulose, and lignin. Five hundred grams of each biomass sample were dried and milled to 212-500 μm size. The plant material was homogenized in 80% (v/v) ethanol using a Polytron Homogenizer (Fisher, USA) at high speed for 2-3 minutes. Homogenate was heated for 1 hour at 80° C., cooled down to room temperature, and centrifuged at 12000 times gravity (G) for 30 minutes. Pellets were resuspended in 80% ethanol, and the procedure was repeated. Pellets were washed three times with 85% acetone, and air dried. Dry pellets were suspended in 0.5% aqueous sodium dodecyl sulfate (SDS) overnight. The residue was recovered and washed with water by filtration, washed with a 1:1 mixture of chloroform and methanol, rinsed with acetone, and air-dried. The resulting cell wall material (CW) was analyzed.

Cellulose Content

The cellulose content was determined by treatment of CW (10 mg) with acetic-nitric reagent (80% acetic acid: concentrated nitric acid, 10:1). Unhydrolyzed pellets were washed several times with water, followed by acetone, air-dried and weighed. Cellulose content was calculated in the percentage of total cell wall.

Hemicellulose Content

The hemicellulose content was estimated by hydrolysis of CW with 2M trifluoroacetic acid (TFA). Unhydrolyzed pellets were washed several times with water, followed by acetone, air-dried and weighed. Acid soluble hemicellulose content was calculated in the percentage of total cell wall.

Lignin Content

The lignin content was determined using the acetyl bromide assay according to Fukushima & Hatfield, *J. Agr. Food Chem.* 52:3713 (2004); Dobele et al., *J. Anal. App. Pyrol.* 49:307 (1999), which are hereby incorporated by reference in their entirety. One milligram of CW was placed in a glass vial, and 2 ml 25% acetyl bromide was added. Samples were incubated at 50° C. for 2 hours with occasional mixing. After cooling, 1 ml of reaction mixture was transferred to a 2 ml centrifuge tube containing 2 ml of 1N sodium hydroxide, and then 1 ml of 1 N hydroxylamine hydrochloride and 4 ml of acetic acid were added. After shaking, the volume was made up to 10 ml using acetic acid. Optical density at 280 nm was measured for the samples against blanks, which contained all reagents except cell walls. The calculation of the lignin content was carried out as outlined in Fukushima & Hatfield, *J. Agr. Food Chem.* 52:3713 (2004); Dobele et al., *J. Anal. App. Pyrol.* 49:307 (1999), which are hereby incorporated by reference in their entirety.

Table 2 shows the structural composition of each feedstock. Samples were tested in duplicates and the uncertainties shown are standard deviations.

TABLE 2

Structural Composition, Concentrations of AAEM, Chlorine, and Moisture Content of Biomass Feedstocks

| Parameter Tested | Switchgrass Mean | Std Dev | Cornstover Mean | Std Dev | Red Oak Mean | Std Dev | Loblolly Pine Mean | Std Dev |
|---|---|---|---|---|---|---|---|---|
| Cellulose (wt %) | 33.26 | 2.03 | 28.89 | 2.19 | 41.01 | 0.2 | 32.06 | 0.31 |
| Hemicellulose (wt %) | 35.29 | 2.64 | 39.21 | 0.79 | 42.61 | 1.92 | 31.83 | 1.87 |
| Lignin (wt %) | 11.54 | 0.89 | 11.69 | 1.25 | 13.02 | 1.83 | 15.61 | 1.58 |
| Potassium (ppm) | 3488 | 71 | 7309 | 284 | 570 | 5 | 420 | 9 |
| Sodium (ppm) | 273 | 5 | 188 | 4 | 179 | 7 | 177 | 2 |
| Calcium (ppm) | 2752 | 51 | 2715 | 55 | 809 | 154 | 1290 | 84 |
| Magnesium (ppm) | 1409 | 33 | 1461 | 35 | 168 | 2 | 405 | 14 |
| Chlorine (ppm) | 3901 | 43 | 1782 | 11 | 407 | 2 | 355 | 3 |
| Moisture in Control (wt %) | 3.25 | 0.09 | 4.16 | 0.24 | 2.8 | 0.16 | 4.17 | 0.11 |
| Moisture in Pretreated (wt %) | 3.33 | 0.13 | 3.79 | 0.04 | 2.66 | 0.21 | 3.6 | 0.11 |

Example 3

Determination of Cation, Chlorine, and Moisture Content of the Biomass

Cation Content

The cation content of the feedstocks was determined using an Inductively Coupled Plasma Spectrometer (ICP) with the standard acid digestion method ASTM D6349 (Standard test method for determination of major and minor elements). The measured AAEM content of each feedstock is listed in Table 2.

Chlorine Content

The chlorine content of the feedstocks was determined using ion chromatography.

Moisture Content

The moisture content was determined using a Mettler Toledo Thermogravimetric Analyzer (TGA) by subjecting 10 mg of a sample to a nitrogen atmosphere at 105° C. for 10 minutes. The resulting mass loss was assumed to be moisture.

All the above tests in this example were run in duplicates and standard deviations were determined. As shown in Table 2, the pretreated feedstocks were dried to similar moisture contents.

Example 4

Pretreatment of Biomass with Acids

Biomass for pyrolysis experiments was ground using a Retsch Type SM2000 Heavy-Duty Cutting Mill with a 750 μm screen. The resulting ground feedstock was sieved using a W.S. Tyler Ro-Tap sieve shaker with screens that allowed separation of the desired size range of 212-500 μm. Five acids (phosphoric, sulfuric, nitric, hydrochloric, acetic, and formic acids) were infused into the biomass at five different loadings (0.5, 1, 2, 5, and 10 wt %). Acid was dissolved in 15 g of water before mixing with a 5 g biomass sample in a 250 mL beaker to ensure a uniform infusion of the acid into the biomass. The damp biomass was then dried in an oven at 50° C. to the same moisture content as the original biomass.

Example 5

Reactions Between AAEM Cations and Cellulose

Experiments were performed with model compounds to understand the reactions between AAEM cations and cellulose. Commercial cellulose of 50 μm particle size obtained from Sigma-Aldrich that had an ash content of less than 0.01 wt % was infused with the respective salts and acids by dissolving the salts and acids in water and mixing with cellulose using the same procedures previously described for biomass feedstocks in Examples 2-4. The samples were dried in an oven at 50° C. for 20 hours.

Example 6

Analytical Pyrolysis of Pretreated Biomass and Cellulose

Analytical pyrolysis of pretreated biomass samples prepared in Example 4 and cellulose samples prepared in Example 5 was performed using a Frontier Lab Double Shot Micropyrolyzer 20202iS coupled to a Varian 450 GC (Gas Chromatography). Sample weights in the range of 450-550 μg produced resolvable spectra for compounds of interest while minimizing mass transfer effects. Pyrolysis was carried out at 500° C. with a 320° C. interface temperature. The volatile products were swept from the micropyrolyzer directly to the 300° C. GC injector using 1 ml/min of helium as a carrier gas. The column used was a Frontier Ultra Alloy 1701 (60 m length, 0.25 mm ID, 0.25 μm film thickness with a stationary phase of 14% phenyl and 86% polysiloxane, medium polar). The column oven started at 45° C. and ramped to 300° C. at 5° C./minute.

A Varian 320 Mass Spectrometer operating in the range of 45 to 650 m/z was used for chemical identification. Once the desired compounds in the pyrolysate were identified, a Varian flame ionization detector (FID) was used in subsequent experiments for the quantification of those compounds. Results are reported as means of triplicate runs with uncertainties estimated as one standard deviation about the mean.

The chromatograms from the gas chromatography-mass spectrometry (GC/MS) show hundreds of compounds in the volatile fraction produced by the pyrolysis of the feedstock. For ease of comprehension, forty of the major compounds found in the pyrolysis vapor as reported by Branca et al., *Ind. Eng. Chem. Res.* 42:3190 (2003); MARSCHNER: MINERAL NUTRITION OF HIGHER PLANTS (Academic Press, London, 1995), which are hereby incorporated by reference in their entirety, were identified and classified into light oxygenates, anhydrosugars, furans, and phenols. The light oxygenates consist of hydroxyacetaldehyde, formic acid, acetic acid, and ketones. The anhydrosugars consist of levoglucosan (LG), levoglucosenone (LGnone), and glucofuranoses. Furfural and other furan compounds were classified as furans while all the phenolic compounds were classified as phenols.

Discussion of Examples 1-6

Pyrolysis of cellulose proceeds as either a slow process that yields mostly char and water, or a fast process that yields LG and a variety of "light oxygenates" including hydroxyacetaldehyde, acetol, and formic acid. The fast pyrolysis pathway is hypothesized to proceed via a poorly characterized reaction intermediate known as "active cellulose" (Shafizadeh, *J. Anal. App. Pyrol.* 3:283 (1982); Patwardhan et al., *J. Anal. App. Pyrol.* 86:323 (2009), which are hereby incorporated by reference in their entirety). As shown in FIG. 1, the active cellulose decomposes either through cleavage of glycosidic bonds that assemble pyranose rings into cellulose chains, or through fragmentation of the pyranose rings. The former yields LG while the latter produces light oxygenates. Glycosidic bond cleavage dominates pyrolysis of pure cellulose (Patwardhan et al., *Bioresource Technol.* 101:4646 (2009); Dwivedi et al., *Energy for Sustainable Development* 13:174 (2009), which are hereby incorporated by reference in their entirety).

Many researchers have observed that naturally occurring alkali and alkaline earth metals (AAEM) in biomass or AAEM added to pure cellulose catalyze ring fragmentation reactions that dramatically lower the yield of LG (Pan & Richards, *J. Anal. App. Pyrol.* 16:117 (1989); Piskorz et al., *J. Anal. App. Pyrol.* 16:127 (1989); Raveendran et al., *Fuel* 74:1812 (1995); Yang et al., *Chem. Res. Chinese U.* 22:524 (2006), Patwardhan et al., *Bioresource Technol.* 101:4646 (2009); Shafizadeh, *J. Anal. App. Pyrol.* 3:283 (1982); Pan & Richards, *J. Anal. App. Pyrol.* 16:117 (1989); Piskorz et al., *J. Anal. App. Pyrol.* 16:127 (1989), which are hereby incorporated by reference in their entirety). Several researchers have suggested a mechanism in which alkali catalyzes pyranose ring scission, as shown in FIG. 1 (Patwardhan et al., *Bioresource Technol.* 101:4646 (2009); Yang et al., *Chem. Res. Chinese U.* 22:524 (2006); Ponder & Richards, *Biomass Bioenerg.* 7:1 (1994); Dwivedi et al., *Energy for Sustainable Development* 13:174 (2009); Piskorz et al., *J. Anal. App. Pyrol.* 16:127 (1989); Raveendran et al., *Fuel* 74:1812 (1995), which are hereby incorporated by reference in their entirety). AAEMs are thought to form coordinate bonds with the oxygen atoms of vicinal hydroxyl groups of the glucose ring thereby making the ring unstable. This instability encourages homolytic fission of the ring during pyrolysis, resulting in the formation of $C_2$ and $C_3$ compounds containing a carbonyl group. The above hypothesis is supported by studies in Patwardhan et al., *J. Anal. App. Pyrol.* 86:323 (2009); Sun & Cheng, *Bioresource Technol.* 83:1 (2002), which are hereby incorporated by reference in their entirety, where cellulose doped with AAEM was used.

If catalytic activity of AAEM can be substantially reduced or eliminated, then cellulose could be depolymerized to sugars by purely thermal processes without the use of enzymes or strong acids, as currently envisioned for the production of cellulosic biofuels. Like the products of enzymatic or acid hydrolysis, these sugars can be fermented or catalytically upgraded (Huber et al., *Chem. Rev.* 106:4044 (2006); Yang et al., *Chem. Res. Chinese U.* 22:524 (2006), which are hereby incorporated by reference in their entirety).

Low-level infusions of mineral acids into biomass prior to pyrolysis can dramatically affect yields of LG, both positively and negatively in a manner not well understood (Dobele et al., *J. Anal. App. Pyrol.* 68-69:197 (2003); Dobele et al., *J. Anal. App. Pyrol.* 74:401 (2005); Hassan et al., *Appl. Biochem. Biotech.* 154:3 (2009); Dobele et al., *J. Anal. App. Pyrol.* 49:307 (1999); Shafizadeh et al., *J. Appl. Polym. Sci.* 23:3525 (1979); Scott et al., *J. Anal. App. Pyrol.* 57:169 (2001); Ponder et al., *J. Anal. App. Pyrol.* 22:217 (1992); Dobele et al., *J. Anal. App. Pyrol.* 68-69:197 (2003), which are hereby incorporated by reference in their entirety). Acid infusion is an attractive pretreatment since the amount of chemicals, water, and energy consumed would be substantially less than for the thorough washing of biomass with dilute acid solutions. However, researchers who have investigated acid infusions as pyrolysis pretreatment did not attribute the efficacy of acid to its interactions with AAEM. Dobele et al., *J. Anal. App. Pyrol.* 68-69:197 (2003); Shafizadeh et al., *J. Appl. Polym. Sci.* 23:3525 (1979), which are hereby incorporated by reference in their entirety, proposed that acid infusions reduced the degree of cellulose polymerization, thus facilitating deconstruction of the biomass upon pyrolysis. These researchers also suspected that acids directly catalyzed the thermal depolymerization of cellulose to LG. They observed that addition of too much acid caused LG yields to decline, which was ascribed to acid catalyzed dehydration of LG to levoglucosenone and other cellulose decomposition products. The chemical reactions between the infused acid and AAEM in the biomass were overlooked, perhaps because metal cations may be expected to already be substantially complexed to chlorine or other strong anions that are naturally found in biomass (Hassan et al., *Appl. Biochem. Biotech.* 154:3 (2009); MARSCHNER: MINERAL NUTRITION OF HIGHER PLANTS (Academic Press, London, 1995), which are hereby incorporated by reference in their entirety). Consequently, it was assumed that as long as AAEM cations were in the biomass, they would be catalytically active regardless of the nature of their complexion with anions (Patwardhan et al., *Bioresource Technol.* 101:4646 (2009); Dwivedi et al., *Energy for Sustainable Development* 13:174 (2009), which are hereby incorporated by reference in their entirety).

In Examples 1-6, it was hypothesized that acid infusions into biomass convert naturally-occurring AAEMs into thermally stable salts, reducing their catalytic activity during pyrolysis and thus allowing cellulose to more readily thermally depolymerize to LG (AAEM passivation hypothesis). To understand the effect of acid infusions on pyrolytic yields of anhydrosugars, biomass pyrolysis experiments were performed in a Frontier Lab Double Shot Micropyrolyzer 2020iS coupled to a Varian 450-GC (Gas Chromatography). A Varian 320 Mass Spectrometer (MS) was used for product identification while a Varian Flame Ionization Detector (FID) was used for species quantification. Experiments were performed with both cellulosic biomass that contained a wide range of naturally occurring AEEM levels and pure cellulose to which metal cations were added (see Examples 1-6).

Figure 3:
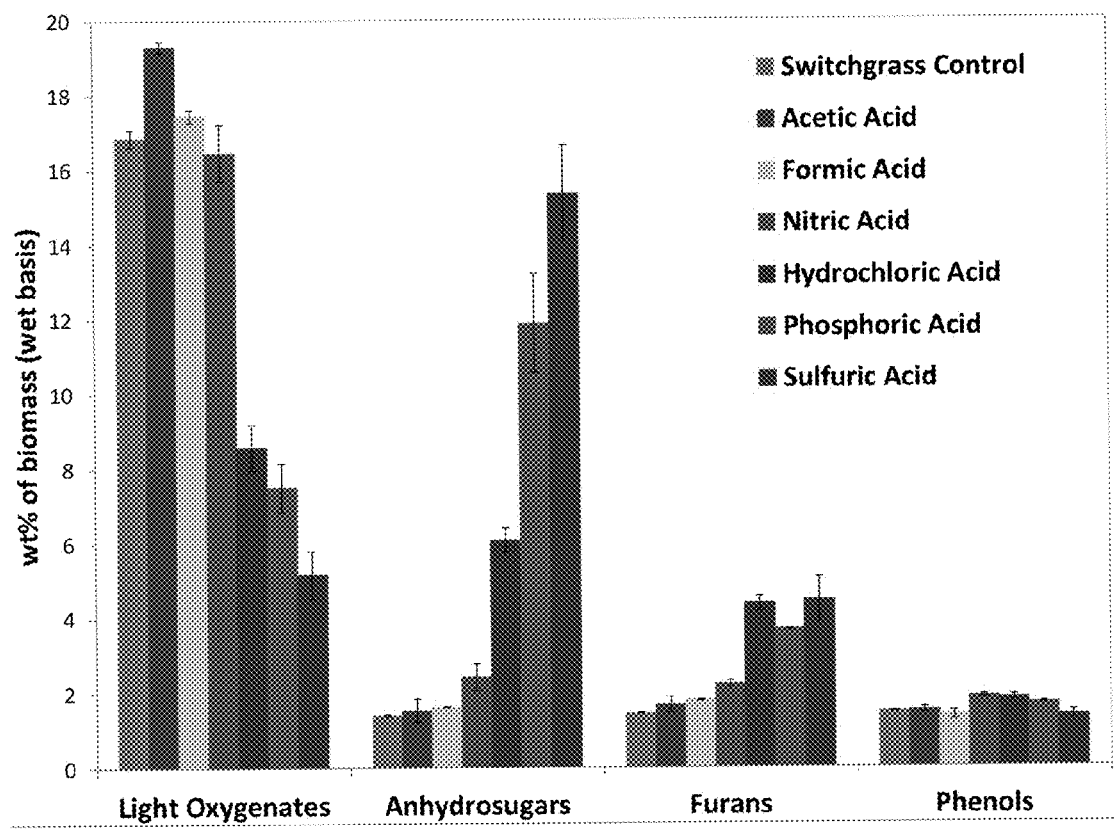
FIG. 3 is a graph showing the yield of volatile compounds for the pyrolysis of switchgrass at 500° C. after pretreatments with 2 wt % infusions of various acids.

Although acid pretreatment has been used to influence the outcome of biomass pyrolysis, differences among acids have not been investigated. If the hypothesis is correct, i.e., the major effect of acid infusions is to produce thermally stable salts from naturally-occurring AAEMs, the pyrolysis product yields should depend upon the type of acid employed. To test this hypothesis, 2 wt % of four mineral acids (phosphoric, sulfuric, hydrochloric, and nitric) and two carboxylic acids (acetic and formic) were infused into samples of switchgrass prior to pyrolysis at 500° C. As shown in FIG. 3, with the exception of nitric acid, additions of 2 wt % mineral acids increased yields of LG from less than 2 wt % for untreated switchgrass to 10-15 wt %. Increases in LG were accompanied by decreases in light oxygenates, which agrees with the hypothesis that AAEM-catalyzed ring fragmentation decreased with respect to thermally-induced cleavage of glycosidic bonds. Also, mineral acid infusions roughly doubled the production of furans compared to the control, which are dehydration products of LG. Phenolic compounds, derived from the lignin content of switchgrass, did not show much effect from the acid infusions.

Among the mineral acids, the order of decreasing effect was $H_2SO_4>H_3PO_4>HCl>HNO_3$, which does not correspond to the pKa of the acids. $HNO_3$ behaved very differently from the other mineral acids. In fact, the effect of $HNO_3$ was closer to that of acetic acid and formic acid, none of which strongly influenced yields. These results would be difficult to understand if the main role of the infused acid was to catalyze dehydration reactions of cellulose during pyrolysis. However, if the infused acids are reacting with AAEMs to reduce their catalytic activity, the differences among the acids are more readily understood. All six acids are expected to react with AAEM in biomass, which is thought to exist as cations or to be weakly complexed with plant polymers (MARSCHNER: MINERAL NUTRITION OF HIGHER PLANTS (Academic Press, London, 1995); BARKER & PILBEAM: HANDBOOK OF PLANT NUTRITION (Taylor & Francis Group, Boca Raton, Fla., 2007); Hassan et al., *Appl. Biochem. Biotech.* 154:3 (2009); Fukushima & Hatfield, *J. Agr. Food Chem.* 52:3713 (2004), which are hereby incorporated by reference in their entirety). However, the salts resulting from the reaction of acids with AAEM will behave differently upon heating. Three of the mineral acids formed chlorides, phosphates, and sulfates that are thermally stable at least at typical pyrolysis temperatures (300-500° C.). These large anions can shield the AAEM cations from effectively reacting with plant carbohydrates. Nitric acid and the two carboxylic acids, on the other hand, formed nitrates, formates, and acetates, respectively, that are known to decompose at pyrolysis temperatures, liberating the AAEM to catalyze ring fragmentation in cellulose (and similarly in hemicellulose). The formation of thermally stable salts appears to be important to understanding the AAEM passivation phenomenon; otherwise, it would be difficult to explain why a strong mineral acid like nitric acid would show little catalytic activity toward cellulose depolymerization and dehydration compared to other mineral acids.

Figure 4:
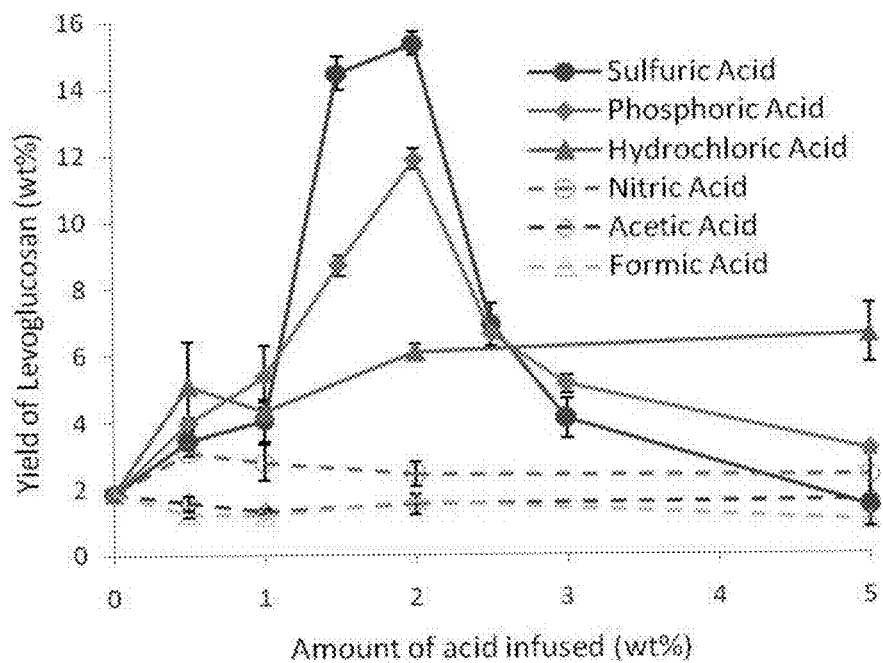
FIG. 4 is a graph showing the yield of anhydrosugars from the pyrolysis of the acid-infused switchgrass at 500° C. Closed symbols and solid lines are acids that produce thermally stable salts; open symbols and dashed lines are acids that produce thermally unstable salts.

The treatment level (amount of the acid used) also revealed differences among the acids. As shown in FIG. 4, sulfuric acid and phosphoric acid pretreatments produced prominent maxima in LG yields near the amount of 2 wt % acid infusions. Hydrochloric acid also substantially increased the yield of LG, but did not display a prominent maximum in the amount used. The variation of the amounts used for nitric acid and the two carboxylic acids did not show any variation in the LG yield. This behavior is consistent with the hypothesis that infused acids react with AAEM cations to form salts that reduce the catalytic activity of the metal cations, allowing thermal depolymerization to anhydrosugar to dominate over cellulose decomposition to light oxygenates. Acid addition beyond the required amount to scavenge the metal cations would be available to catalyze polymerization and/or dehydration of LG, explaining the existence of an optimal acid infusion level. Excess hydrochloric acid, which has a significantly lower boiling point (<108° C.) than either sulfuric acid (337° C.) or phosphoric acid (158° C.), may rapidly vaporize during biomass pyrolysis, reducing its opportunity to catalyze polymerization and/or dehydration of LG.

The occurrence of maxima for sulfuric acid and phosphoric acid treatments appeared to be qualitatively explainable by the acid catalyst hypothesis of Piskorz et al., *J. Anal. App. Pyrol.* 16:127 (1989); Dobele et al., *J. Anal. App. Pyrol.* 49:307 (1999); Shafizadeh, *J. Anal. App. Pyrol.* 3:283 (1982); Dobele et al., *J. Anal. App. Pyrol.* 68-69:197 (2003), which are hereby incorporated by reference in their entirety: low levels of infused acid facilitates the depolymerization of cellulose to LG although eventually the concentration of acid becomes high enough to promote acid-catalyzed dehydration of the produced LG. However, one would expect the other acids, nitric acid in particular, to show similar behavior. The fact that the acids did not behave similarly suggests that the acid catalyst hypothesis of Piskorz and Dobele cannot explain the observed phenomena.

Figure 5:
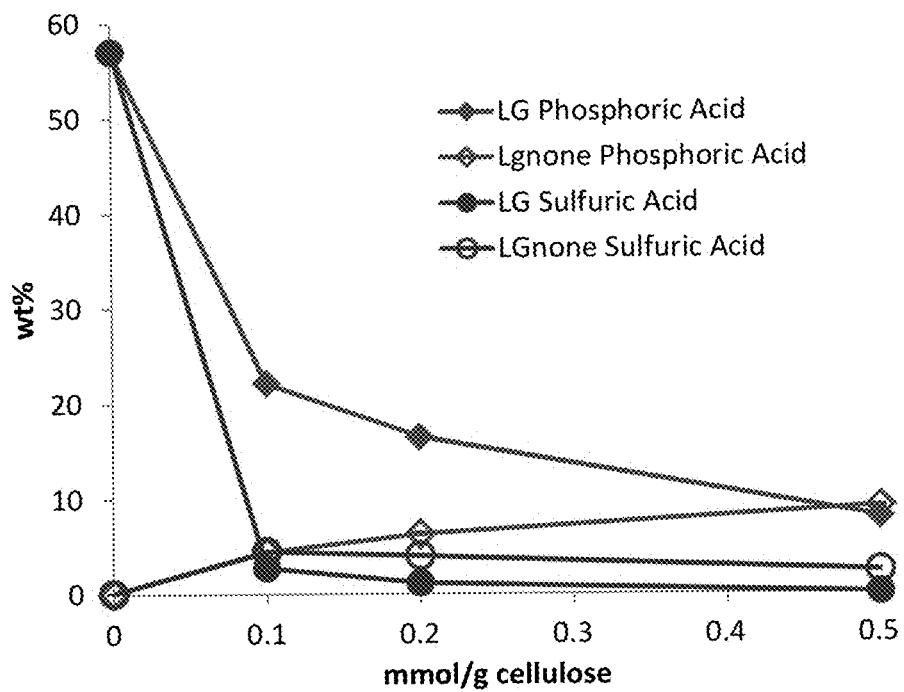
FIG. 5 is a graph showing that the yield of LG from pyrolysis of pure cellulose at 500° C. monotonically decreases with increasing levels of infused sulfuric or phosphoric acid. Levoglucosenone (Lgnone), a dehydration product of LG, increases but not sufficiently to explain the disappearance of LG.

Further evidence against the Dobele hypothesis (Fukushima & Hatfield, *J. Agr. Food Chem.* 52:3713 (2004), which is hereby incorporated by reference in its entirety) is the absence of a maximum in the yield of LG for the pyrolysis of the acid-infused cellulose that contained no AAEM (pure cellulose). As shown in FIG. 5, the LG yield decreased monotonically with increasing infusions of sulfuric and phosphoric acids into the pure cellulose. Why the peak in the LG concentration is absent in this control experiment is completely unexplainable by the Dobele hypothesis. In these control experiments, levoglucosenone, a dehydration product of LG, appeared as a pyrolysis product (FIG. 5) but not in sufficient quantity to explain the disappearance of LG. Although it can be argued that the effect of the acid is to catalyze the fragmentation of pyranose rings, it can also catalyze the polymerization of LG, which subsequently dehydrates to char and furans (BARKER & PILBEAM: HANDBOOK OF PLANT NUTRITION (Taylor & Francis Group, Boca Raton, Fla., 2007); FRANCIS: CRC HANDBOOK OF CHEMISTRY AND PHYSICS (92nd ed., Boulder, Colo., 2011), which are hereby incorporated by reference in their entirety).

Figure 6:
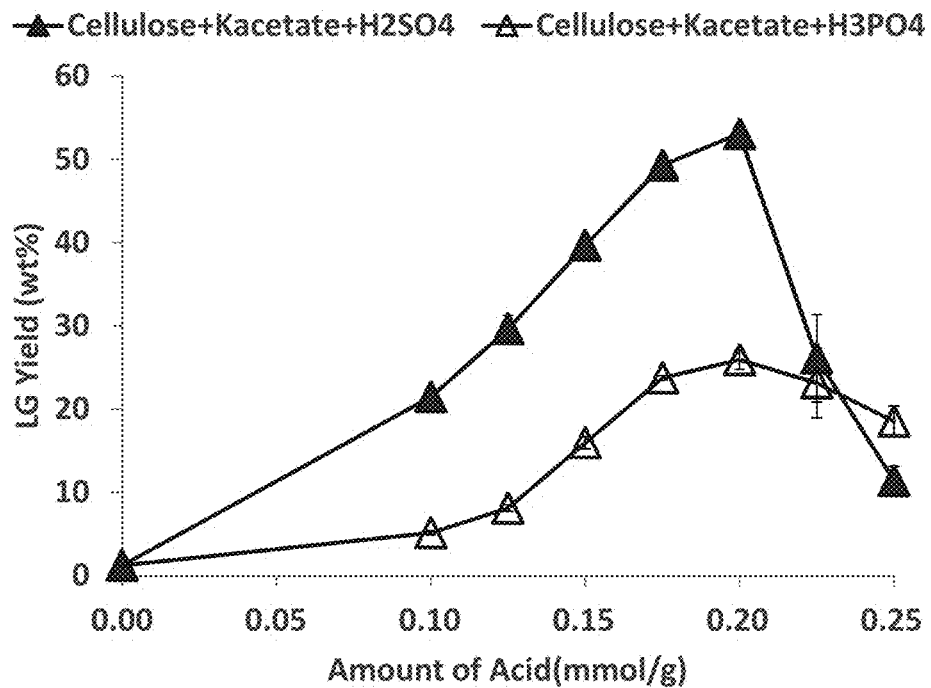
FIG. 6 is a graph showing the LG yield versus the acid infusion level for pyrolysis at 500° C. of cellulose doped with 0.2 mmol potassium acetate per gram of cellulose.

However, if acid infusions of biomass are actually converting naturally-occurring AAEM into thermally stable salts, then it is possible to simulate the results provided in the biomass containing naturally-occurring AAEM in pure cellulose where AAEM has been added (FIG. 5). For this experiment (Example 5), the AAEM needs to be added in a form similar to the naturally-occurring AAEM in the biomass, which is thought to be associated with nitrate and chloride anions or coordination-bonded to plant polymers (MARSCHNER: MINERAL NUTRITION OF HIGHER PLANTS (Academic Press, London, 1995); BARKER & PILBEAM: HANDBOOK OF PLANT NUTRITION (Taylor & Francis Group, Boca Raton, Fla., 2007); Hassan et al., *Appl. Biochem. Biotech.* 154:3 (2009); Fukushima & Hatfield, *J. Agr. Food Chem.* 52:3713 (2004), which are hereby incorporated by reference in their entirety). Although chloride would be thermally stable during pyrolysis, it occurs at relatively low molar quantities in most kinds of biomass. Neither alkali nitrates nor organically bound AAEM is thermally stable at pyrolysis temperatures. For this experiment (Example 5), 0.20 mmol/g of potassium acetate was added to cellulose to simulate naturally-occurring AAEM in the biomass. The cellulose was then infused with either sulfuric or phosphoric acid in the range of 0 to 0.25 mmol/g, and pyrolyzed at 500° C. As shown in FIG. 6, salt-treated cellulose produced less than 3.5 wt % LG if pyrolyzed without the acid pretreatment. Levoglucosan yield from the alkali-treated cellulose increased significantly when pre-infused with a mineral acid. The pre-infusion of $H_2SO_4$ into the alkali-treated cellulose increased LG to levels comparable to that for pure cellulose (59 wt %). The effect was smaller for infusion of $H_3PO_4$ into alkali-treated cellulose, but still yielded about 25 wt % LG. These results are in qualitative agreement with results of acid infusions of the biomass having naturally-occurring AAEM, as show in FIG. 3, which reveals $H_2SO_4$ to be more effective than $H_3PO_4$ in enhancing LG yields for a biomass. The fact that the experiment in Example 5 was able to simulate the effect of acid pretreatments on a biomass strongly supports the AAEM passivation hypothesis.

Regardless of the acid used, the optimal acid/K molar ratio for $CH_3COOK$ treated cellulose was 1.0. The first degree dissociation constant of sulfuric acid is very large while the second degree dissociation constant is in the order of $10^{-2}$ (FRANCIS: CRC HANDBOOK OF CHEMISTRY AND PHYSICS (92nd ed., Boulder, Colo., 2011); Branca et al., *Ind. Eng. Chem. Res.* 42:3190 (2003), which are hereby incorporated by reference in their entirety). The first degree dissociation constant of phosphoric acid is in the order of $10^{-2}$ while second and third degree dissociation constants are in the order of $10^{-7}$ and $10^{-12}$ (FRANCIS: CRC HANDBOOK OF CHEMISTRY AND PHYSICS (92nd ed., Boulder, Colo., 2011); Branca et al., *Ind. Eng. Chem. Res.* 42:3190 (2003), which are hereby incorporated by reference in their entirety). From FIG. 6 and these dissociation constants, it seems likely that the salts formed are mostly potassium monohydrogen sulfate ($KHSO_4$) and potassium dihydrogen phosphate ($KH_2PO_4$). Upon heating, $KHSO_4$ forms potassium pyrosulfate ($K_2S_2O_7$) that further decomposes to form thermally stable potassium sulfate ($K_2SO_4$) (SADTLER & HOSTMANN: A TEXTBOOK OF CHEMISTRY: INTENDED FOR THE USE OF PHARMACEUTICAL AND MEDICAL STUDENTS (J.B. Lippincott Company, Philadelphia, Pa., 1918); BARKER & PILBEAM: HANDBOOK OF PLANT NUTRITION (Taylor & Francis Group, Boca Raton, Fla., 2007), which are hereby incorporated by reference in their entirety). On the other hand, $KH_2PO_4$ decomposes to potassium metaphosphate ($[KPO_3]_n$), which is thermally stable (AVERBUCH-POUCHOT: TOPICS IN PHOSPHATE CHEMISTRY (World Scientific Singapore, River Edge, N.J., 1996); FRANCIS: CRC HANDBOOK OF CHEMISTRY AND PHYSICS (92nd ed., Boulder, Colo., 2011), which are hereby incorporated by reference in their entirety).

Figure 7:
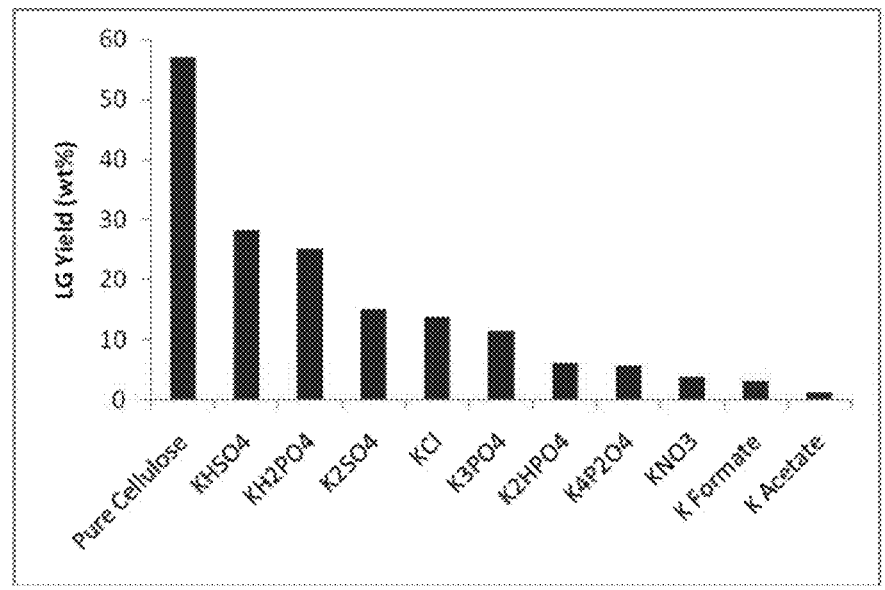
FIG. 7 is a graph comparing the LG yield for pyrolysis at 500° C. of pure cellulose and cellulose doped with various potassium salts.

To investigate whether there were differences in the catalytic activity of various AAEM salts, pure cellulose was doped with 0.2 mmol/g of potassium in the form of the various salts that might form from mineral acid infusions. These included $K_2SO_4$, $KHSO_4$, tripotassium phosphate ($K_3PO_4$), $K_2HPO_4$, $KH_2PO_4$, potassium pyrophosphate ($K_4P_2O_7$), $KNO_3$, $KCl$, $CH_3COOK$, and potassium formate (HCOOK). These samples were pyrolyzed without acid infusions at 500° C. As shown in FIG. 7, the order of decreasing LG yields was: $KHSO_4 > KH_2PO_4 > KCl > K_2SO_4 > K_3PO_4 > K_2HPO_4 > K_4P_2O_7 > KNO_3 > HCOOK > CH_3COOK$. This result is consistent with the variations in the efficacy of acid infusions ($H_2SO_4 > H_3PO_4 > KCl > HNO_3$), although differences among the various forms of sulfates and phosphates are not easy to explain. It is worth noting that all of the salts greatly reduced LG yields compared to pure cellulose, which suggests that passivation of alkali does not fully explain the effect of acid infusions on LG yields. The highest yielding salts ($KHSO_4$ and $KH_2PO_4$) are hydrogen donors, although they are much weaker acids than the mineral acids infused into biomass.

Figure 8:
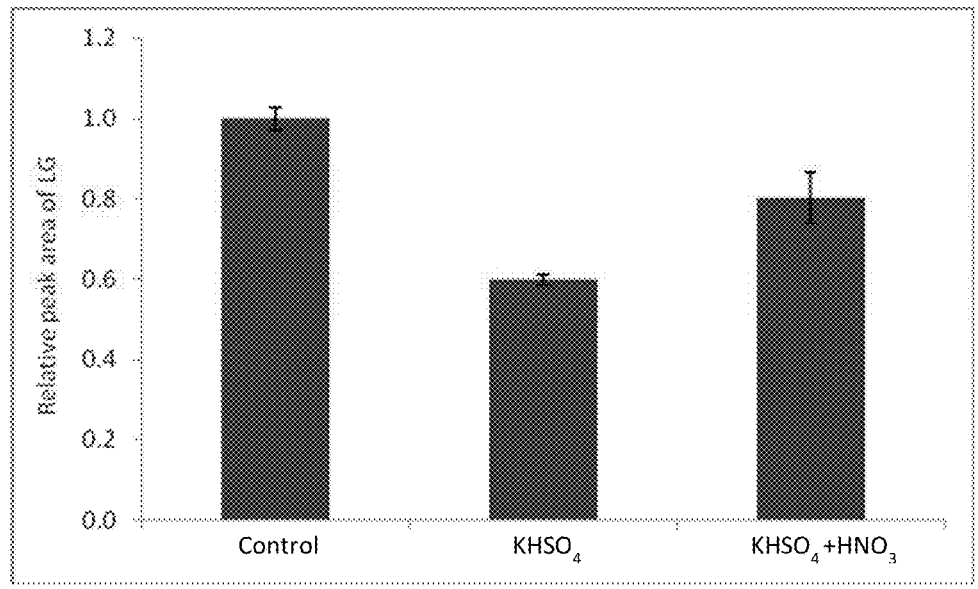
FIG. 8 is a graph showing the effect of combined salt and acid pretreatment on the yield of LG from cellulose. Pretreatment levels were 0.2 mmol/g $KHSO_4$ and 0.2 mmol/g $HNO_3$, followed by pyrolysis at 500° C.

The fact that neither acids nor thermally stable salts alone can produce LG yields from cellulose comparable to that achieved from the acid-infused biomass suggests that the addition of an acid to a biomass not only converts the AAEM into catalytically inactive salts but exchanges hydrogen ions into the biomass where they catalyze the depolymerization of cellulose to LG. To test this hypothesis, pure cellulose was prepared three ways: 1) without pretreatment; 2) pretreated with 0.2 mmol/g of $KHSO_4$ (a suspected product salt); and 3) pretreated with 0.2 mmol/g $KHSO_4$ and 0.2 mmol/g $HNO_3$. If the above hypothesis is correct, then the loss of LG yield observed in the presence of salt should be substantially restored by the addition of acid. In fact, as shown in FIG. 8, addition of acid in the presence of $KHSO_4$ increased LG yield, which may not have been expected from the effect of acid on pure cellulose (see FIG. 5).

Figure 9:
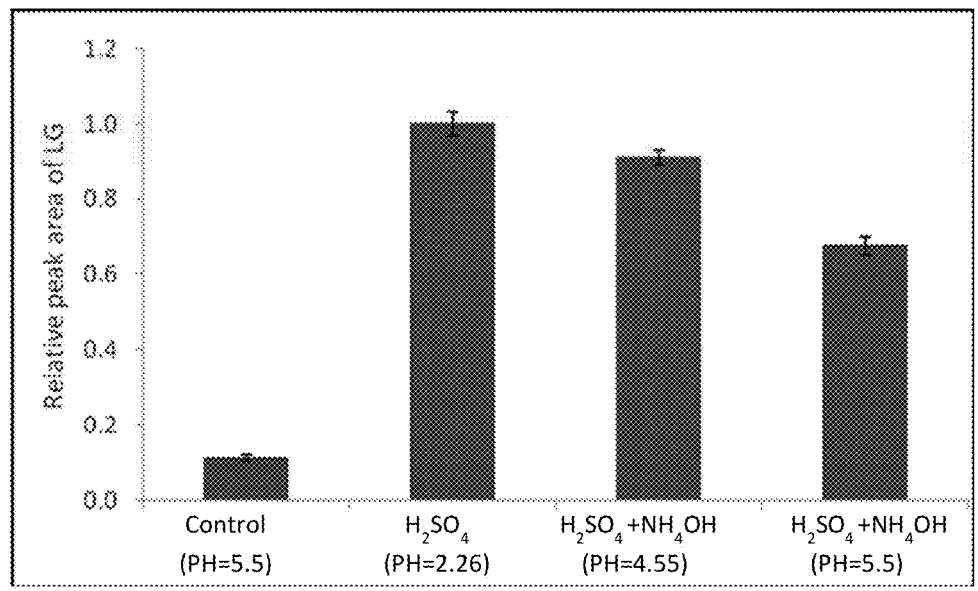
FIG. 9 is a graph showing the effect of pH on the pyrolysis yield of LG for acid-infused switchgrass. $H_2SO_4$ was infused at 0.2 mmol/g; pH adjustment was made with $NH_4OH$; pyrolysis was performed 500° C.
Figure 10:
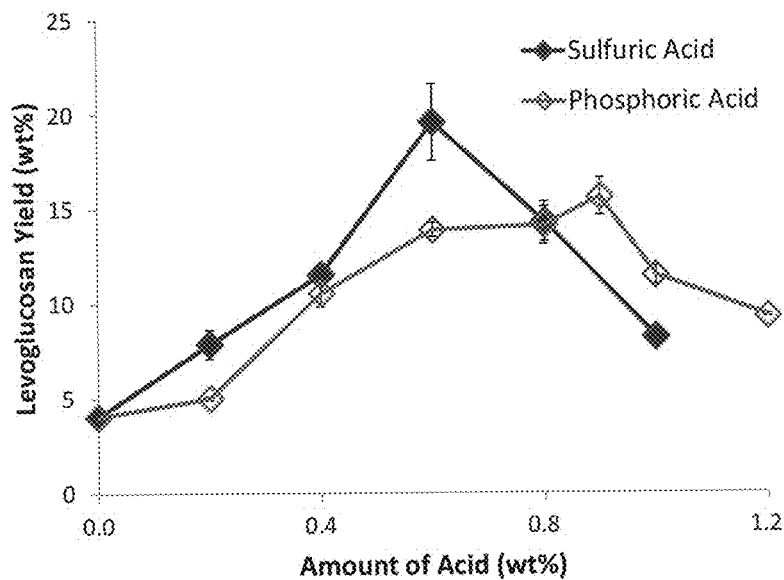
FIG. 10 is a graph showing the yield of LG from pyrolysis of loblolly pine at 500° C. as a function of the amount of infused phosphoric and sulfuric acids.
Figure 11:
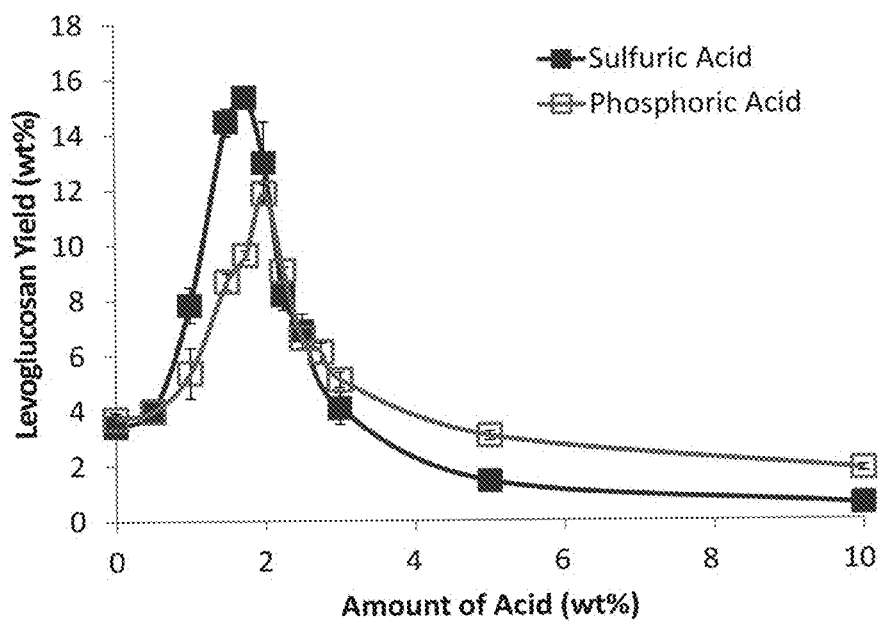
FIG. 11 is a graph showing the yield of LG from pyrolysis of switchgrass at 500° C. as a function of the amount of infused phosphoric and sulfuric acids.
Figure 12:
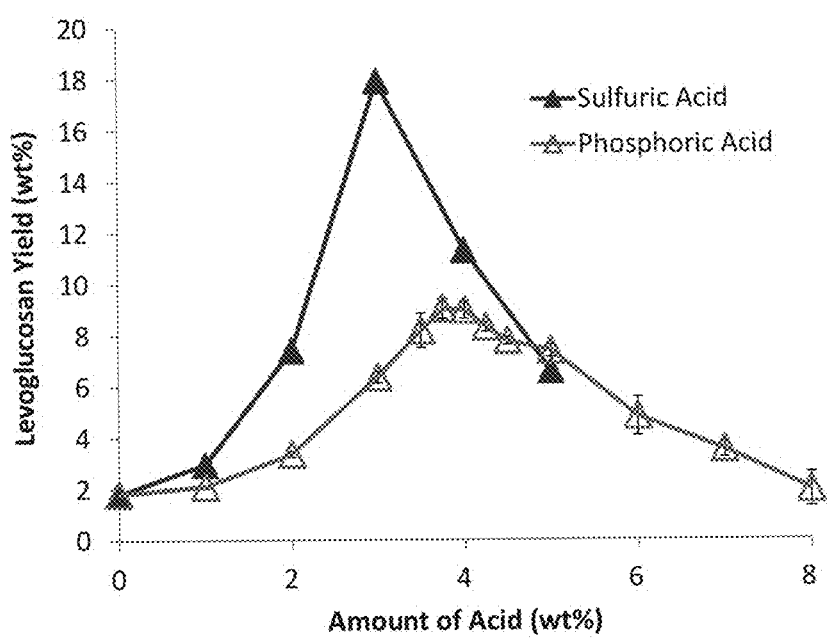
FIG. 12 is a graph showing the yield of LG from pyrolysis of corn stover at 500° C. as a function of the amount of infused phosphoric and sulfuric acids.

As an alternative test of this hypothesis, the as-received switchgrass was treated with 0.2 mmol/g of sulfuric acid for approximately 15 hours, followed by addition of different concentrations of $NH_4OH$ for the purpose of neutralizing the acidity of the sample without introducing additional metal cations to the biomass. If the hypothesis is correct, then LG yields should be substantially suppressed from what is achieved with acid-infused switchgrass. As shown in FIG. 9, the LG yield decreased as the pH of the sample increased, suggesting that acid catalysis played a secondary role in enhancing LG yield from cellulose, at least in the presence of the salts formed during the AAEM passivation. Based on FIG. 9, it would appear that acid catalysis might contribute 20% of the enhancement in LG yield upon acid infusion in biomass while AAEM passivation contributes the balance of the enhancement.

The fact that mineral acids catalyzed pyranose ring fragmentation in pure cellulose and glycosidic bond breakage in the presence of AAEM suggests that AAEM cations react with mineral acids to form weak acids that buffer the pH of the acid-infused biomass. Buffering can be desirable for specific (vs. general) acid catalysis, in which a proton is rapidly transferred to a substrate in a rapid pre-equilibrium followed by the rate-limiting reaction of the protonated substrate to form the final products (LARSON & WEBER: REACTION MECHANISMS IN ENVIRONMENTAL ORGANIC CHEMISTRY (Lewis Publishers, Boca Raton, Fla., 1994); SADTLER & HOSTMANN: A TEXTBOOK OF CHEMISTRY: INTENDED FOR THE USE OF PHARMACEUTICAL AND MEDICAL STUDENTS (J.B. Lippincott Company, Philadelphia, Pa., 1918), which are hereby incorporated by reference in their entirety). For specific acid catalysis, the rate of reaction is controlled by pH rather than acid concentration. Thus buffering will strongly influence the outcome of the reaction. Oxygen is particularly suitable as a substrate because its high electronegativity promotes fast proton transfer (LARSON & WEBER: REACTION MECHANISMS IN ENVIRONMENTAL ORGANIC CHEMISTRY (Lewis Publishers, Boca Raton, Fla., 1994); SADTLER & HOSTMANN: A TEXTBOOK OF CHEMISTRY: INTENDED FOR THE USE OF PHARMACEUTICAL AND MEDICAL STUDENTS (J.B. Lippincott Company, Philadelphia, Pa., 1918), which are hereby incorporated by reference in their entirety), thus specific acid catalysis is a likely mechanism for glycosidic bond breakage.

Both KHSO$_4$ and KH$_2$PO$_4$ are weak acids:
KHSO$_4$ ⇔ H$^+$+KSO$_4^-$
KH$_2$PO$_4$ ⇔ H$^+$+KHPO$_4^-$
Thus, the addition of strong mineral acids will react with the naturally occurring AAEM in a biomass to form acid salts that buffer the system to pH levels that favor glycosidic bond breakage.

These previous results suggest that, for a given sample of a biomass, there exists a desirable acid pretreatment level that depends upon the amount of the AAEM (potassium, sodium, calcium, and magnesium) in the sample. This was investigated by determining the desirable infusions of sulfuric and phosphoric acids for a diverse set of biomass feedstocks (red oak, loblolly pine, switchgrass, and corn stover) containing a wide range of the AAEM content (see Table 2).

Figure 13:
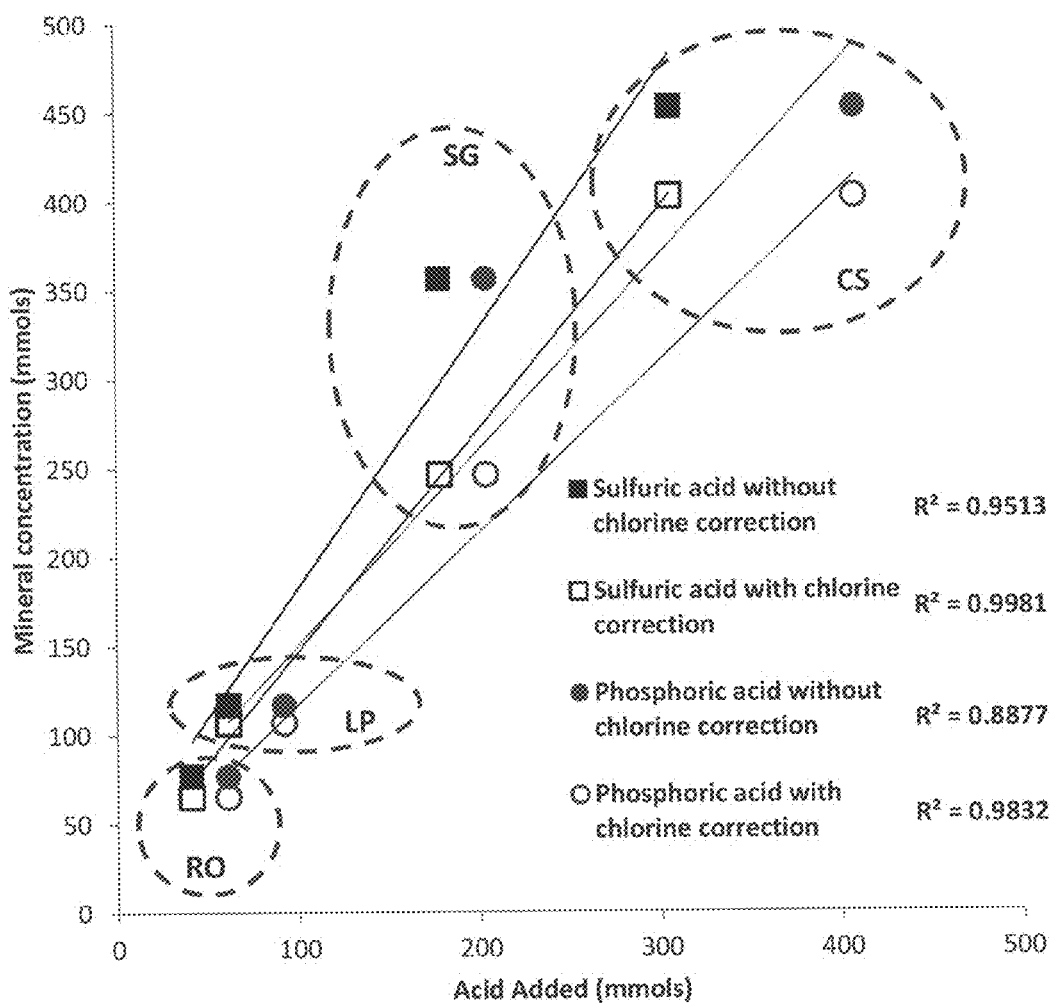
FIG. 13 is a graph showing the correlation between the total AAEM valency (K+Na+2Ca+2Mg) or chlorine corrected AAEM valency (K+Na+2Ca+2Mg—Cl) of a biomass and the optimal addition of phosphoric or sulfuric acid for the maximum yield of LG from pyrolysis at 500° C. (RO: Red oak, LP: Loblolly Pine, SG: Switchgrass, CS: Corn Stover).

As shown in FIGS. 2 and 10-12, all four feedstocks showed prominent maxima in LG yields vs. the amount of the infused acid. For each acid, these maxima were plotted against the total valency of the AAEM in the biomass (i.e., mmol of K+Na+2Ca+2Mg). As shown in FIG. 13, linear plots were obtained for both phosphoric and sulfuric acids, with correlation coefficients of 0.89 and 0.95, respectively. Chlorine (Cl) in the biomass is expected to strongly bond to the AAEM, reducing the amount of the acid required to achieve maximum LG yields. To correct for this effect, FIG. 13 also includes plots of total valency of the AAEM reduced by the valency of the Cl in the biomass (i.e., mmol of K+Na+2Ca+2Mg—Cl). This correction improved the correlations for phosphoric and sulfuric acids to 0.983 and 0.998, respectively. These plots demonstrate that the knowledge of the mineral content of biomass is sufficient to predict the optimal desirable acid addition for maximum LG yields.

The amount of the acid consumed in these experiments gives some indication of the specific salts formed. Table 3 compares the amount of sulfuric and phosphoric acid required to achieve maximum LG yields to the amount of these acids to produce sulfates, hydrogen sulfate, phosphates, monohydrogen phosphates, and dihydrogen phosphates. For all four biomass feedstocks, the amount of sulfuric and phosphoric acid consumed was far more than required to form neutral sulfates and phosphates, suggesting the formation of the acid salts.

The potential of the acid infusion is defined as the weight percent of cellulose in the biomass multiplied by the experimentally observed maximum yield of LG for pure cellulose (59 wt %). The effectiveness of the acid infusion is defined as the actual yield of LG from the acid-infused biomass divided by the potential yield of LG from the cellulose contained in that biomass sample. As shown in Table 4, the effectiveness of the acid infusion to enhance LG yields was greater than 83% and ranged as high as 99.7%.

TABLE 4

Effectiveness of Acid Infusions in Producing LG from Pyrolysis of Biomass at 500° C.

| Feedstock | Potential LG Yield[1] (wt %) | H$_3$PO$_4$ Infusion | | H$_2$SO$_4$ Infusion | |
|---|---|---|---|---|---|
| | | LG Yield (wt %) | Effectiveness[2] (%) | LG Yield (wt %) | Effectiveness[2] (%) |
| Switchgrass | 20.7 | 11.9 | 64.5 ± 1.7 | 15.4 | 83.4 ± 2.0 |
| Cornstover | 18.4 | 9.0 | 43.4 ± 1.9 | 17.9 | 86.3 ± 7.2 |
| Red Oak | 25.0 | 19.1 | 76.6 ± 4.8 | 23.4 | 94.0 ± 3.6 |
| Loblolly Pine | 20.4 | 15.6 | 79.6 ± 4.3 | 19.6 | 99.7 ± 8.8 |

[1]Potential yield = wt % celluose in biomass × wt % LG yield for pure cellulose
[2]Effectiveness of acid diffusion = actual LG yield/potential yield Depolymerization of cellulose offers the prospect of inexpensive sugars from biomass. Breaking the glycosidic bonds of cellulose to liberate glucose has usually been pursued by enzymatic hydrolysis although a purely thermal depolymerization route to sugars is also possible. Fast pyrolysis of pure cellulose yields primarily the anhydrosugar levoglucosan while the presence of naturally-occurring AAEM in biomass is strongly catalytic toward ring-breaking reactions that favor formation of light oxygenates.

The results from Examples 1-6 revealed a simple method for the pyrolytic production of sugars without the use of enzymes or catalysts. A method of significantly increasing the yield of sugars from biomass by purely thermal means through passivation of the AAEM prior to pyrolysis has been shown. Passivation includes infusing mineral acids into the biomass to convert the AAEM into thermally stable salts, which diminishes the catalytic activity of the metals. Using a simple acid pretreatment, the catalytic activity of naturally-

TABLE 3

Acid Required to Convert AAEMs into Various Salts to the Amount of Acid Added to Achieve Maximum LG Yields for Pyrolysis of Biomass at 500° C.

| Feedstock | Adjusted metal valency* (mmol/g) | Stoichiometric acid requirement to produce prospective anions (mmol/g) | | | | | Acid consumed for max LG yield (mmol/g) | |
|---|---|---|---|---|---|---|---|---|
| | | H$_2$PO$_4^{-1}$ | HPO$_4^{-2}$ | PO$_4^{-3}$ | HSO$_4^{-1}$ | SO$_4^{-2}$ | H$_3$PO$_4$ | H$_2$SO$_4$ |
| Cornstover | 0.40 | 0.40 | 0.20 | 0.13 | 0.40 | 0.20 | 0.41 | 0.30 |
| Switchgrass | 0.24 | 0.24 | 0.12 | 0.08 | 0.24 | 0.12 | 0.20 | 0.18 |
| Loblolly Pine | 0.11 | 0.11 | 0.055 | 0.037 | 0.110 | 0.055 | 0.082 | 0.061 |
| Red Oak | 0.065 | 0.065 | 0.033 | 0.022 | 0.065 | 0.033 | 0.061 | 0.041 |

*Total valency of metal minus valency of chlorine in biomass (K + Na + 2Ca + 2Mg − Cl)

occurring AAEM in biomass is dramatically reduced, allowing the purely thermal production of sugars from biomass.

The process, which requires only small quantities of mineral acids to passivate the AAEM in biomass prior to pyrolysis, increases the prospects for economical production of advanced biofuels and commodity chemicals from cellulosic biomass.

Example 7

Temperature Dependence of Levoglucosan Yield from Fast Pyrolysis of Acid-Infused Biomass Five grams of each of switchgrass, red oak, corn stover, and loblolly pine were pretreated with phosphoric and sulfuric acids separately by diluting the acid with deionized water and wetting it. The amounts of phosphoric and sulfuric acids used are shown in Table 5. These were the desirable amounts to obtain the maximum yields of LG as determined from Examples 1-6. The pretreated feedstocks were dried in an oven at 50° C. for 20 hours and then subjected to analytical pyrolysis on a micropyrolyzer/GC/FID set up.

TABLE 5

The Amount of Acid Added to Biomass Feedstocks to Obtain Maximum Yield of LG Feedstock

| Feedstock | Amount of acid added (wt %) | |
|---|---|---|
| | Phosphoric | Sulfuric |
| Switchgrass | 2.00 | 1.75 |
| Red Oak | 0.60 | 0.40 |
| Corn Stover | 4.00 | 3.00 |
| Loblolly Pine | 0.90 | 0.60 |

It was shown in Examples 1-6 that infusion of mineral acids converts alkali and alkaline earth metals in a biomass into thermally-stable salts, reducing their catalytic activity during fast pyrolysis. The suppression of metal-catalyzed ring breaking reactions allows depolymerization to dominate pyrolysis reactions, resulting in enhanced yields of levoglucosan (LG) in batch pyrolysis trials of milligram quantities of biomass. However, replicating these results in a larger scale, continuous flow pyrolyzers operated at 500° C. were difficult and yielded large quantities of char from the acid-infused biomass.

Without being bound by theory, it was hypothesized that LG polymerizes at about 270° C. to form non-volatile oligosaccharides, which cannot escape the pyrolyzer. Under equilibrium conditions, charring of LG-derived oligosaccharides at temperatures as low as 280° C. was observed (Kawamoto et al., *J. Wood Sci.* 49(5):469-73 (2003); Kawamoto et al., *J. Anal. Appl. Pyrol.* 85(1-2):247-51 (2009), which are hereby incorporated by reference in their entirety). Thus, to maximize yields of LG from the acid-infused biomass, pyrolysis at lower temperatures may be required. Example 7 thus explored the temperature-dependence of the LG yield from pyrolysis of the acid-infused biomass using a micropyrolyzer/GC/FID.

Figure 14:
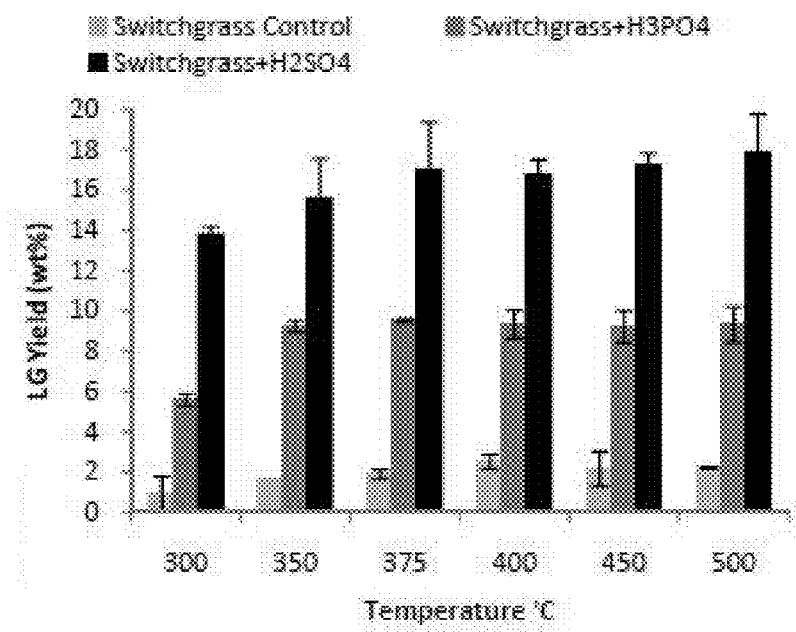
FIG. 14 is a graph showing the LG yield from the pyrolysis of switchgrass: control vs. acid-infused sample.

The yields of LG from the pyrolysis of a biomass at a temperature range of 300° C. to 500° C. were compared for the untreated switchgrass (the control) and the switchgrass infused with phosphoric acid and sulfuric acid. As shown in FIG. 14, the LG yields from the control did not change significantly at the temperature range of 350° C. to 500° C., achieving about 2 wt % LG. The yields of LG from the switchgrass infused with phosphoric acid and sulfuric acid were also relatively constant at temperatures above 350° C., with the amounts of LG significantly higher than that of the control (achieving 9 wt % and 18 wt % for phosphoric acid- and sulfuric acid-infused switchgrass, respectively). Since operation of the pyrolyzer at lower temperatures is expected to slow the rate of polymerization, these results suggest that the pyrolyzer needs to be operated closer to 350° C. than the traditional 500° C. if high yields of LG are to be obtained from the acid-infused switchgrass.

Figure 15:
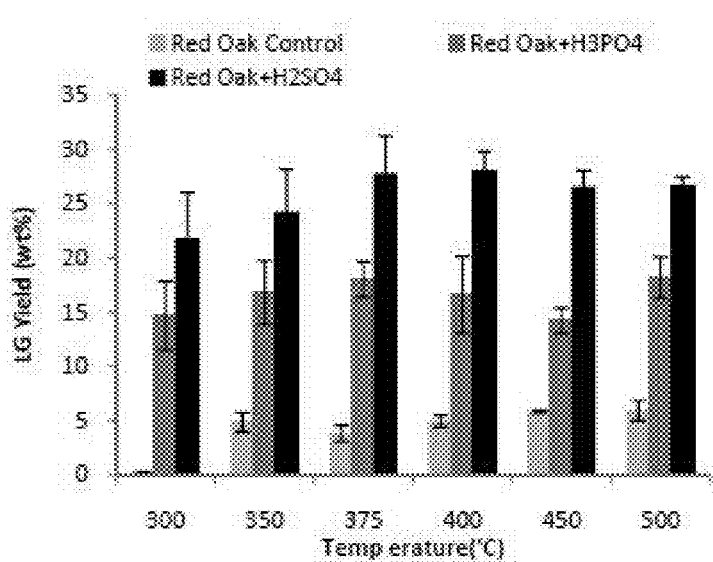
FIG. 15 is a graph showing the LG yield from the pyrolysis of red oak: control vs. acid-infused sample.

For red oak, pyrolysis of the control at 300° C. yielded almost no LG, which increased to about 5 wt % at the temperature range of 350° C. to 500° C. (FIG. 15). Pyrolysis of the acid-infused red oak produced almost constant yields of LG at temperatures above 300° C., yielding 17 wt % and 27 wt % for phosphoric acid and sulfuric acid-infused red oak, respectively, within the uncertainty of the data. Thus, operating a continuous flow reactor at 300-350° C. may allow significant quantities of LG to be recovered without charring.

Figure 16:
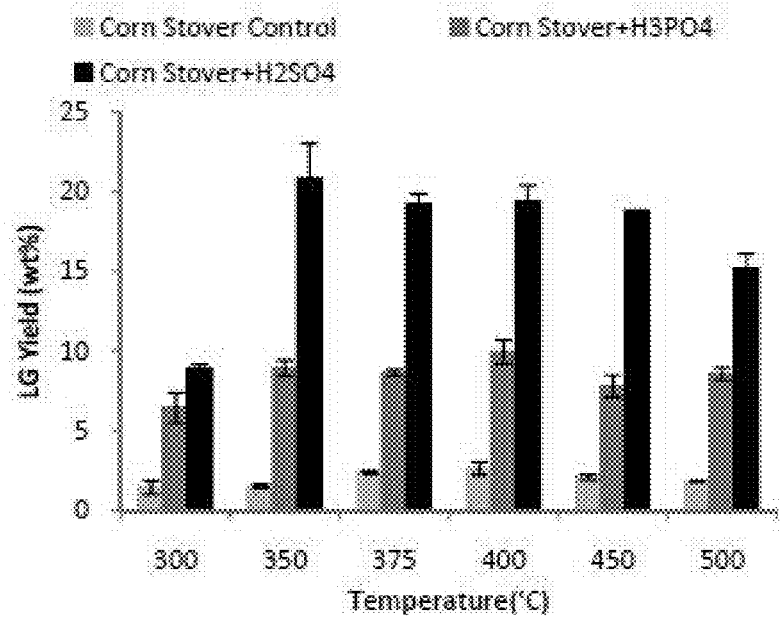
FIG. 16 is a graph showing the LG yield from the pyrolysis of corn stover: control vs. acid-infused sample.

As shown in FIG. 16, the yield of LG from the corn stover control was very low (<2 wt %) at 300° C., which increased only slightly at the temperature range of 350° C. to 500° C. Infusion of phosphoric acid increased the yield of LG at 300° C. to 8 wt %, which increased slightly at the temperature range of 350° C. to 500° C. Infusion of sulfuric acid increased the yield of LG at 300° C. to 9 wt %, which increased dramatically to 21 wt % at 350° C. and held relatively constant at temperatures as high as 500° C. Thus, the desirable temperature for LG recovery from the continuous pyrolysis of the acid-infused cornstover may be as low as 350° C.

Figure 17:
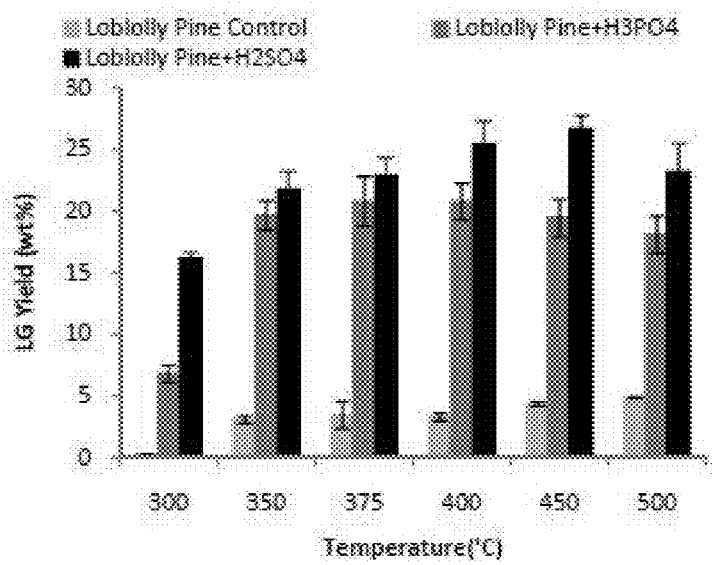
FIG. 17 is a graph showing the LG yield from the pyrolysis of loblolly pine: control vs. acid-infused sample.

As shown in FIG. 17, the yield of LG from the loblolly pine control was very low (<0.5 wt %) at 300° C., which increased to 3 wt % at 350° C. and further increased to 4 wt % at 500° C. Infusion of phosphoric acid increased the yield of LG to 7 wt % at 300° C., which further increased to 20 wt % at 350° C. Between 350° C. and 500° C., there was not statistically significant difference in the LG yield. Infusion of sulfuric acid increased the yield of LG at 300° C. to 16 wt %, which increased further to 22 wt % at 350° C. and 26 wt % at 450° C. Thus, there was some advantage in running at temperatures in the range of 400-450° C. when pyrolyzing the acid-infused loblolly pine. However, at this temperature range, there may be increased polymerization of LG and its subsequent charring.

The yields of LG from acid-infused feedstocks were almost constant at temperatures above 300-350° C., except for loblolly pine infused with sulfuric acid. Since high concentrations of LG promote its polymerization to low volatility oligosaccharides at temperatures as low as 280° C., there can be advantages in operating continuous flow pyrolyzers at temperatures as low as 300-350° C., when processing the acid-infused biomass to mitigate the charring of saccharide products and to promote their volatilization as LG.

Example 8

Materials and Methods

Northern red oak (*Quercus Rubra* L.) obtained from Wood Residuals Solutions (Montello, Wis.) was the biomass used for the thermochemical process development in this example. The feedstock was prepared by grinding red oak chips followed by infusion with sulfuric acid at an acid loading of 0.4 wt %. Grinding was carried out using a Retsch Type SM2000 Heavy-Duty Cutting Mill with a 750-μm screen. The resulting feedstock was sieved using a W.S. Tyler™ Ro-Tap® Sieve Shaker with screens that allowed separation of the desired size range of 212-400 μm. Acid-infused feedstock was prepared by infusing sulfuric acid into the red oak feedstock, which was used as the control feedstock. 3 kg of red oak feedstock and 12 g of sulfuric acid were weighed out. The acid was diluted with water at a water-to-biomass ratio of 3:1, and then mixed thoroughly with the feedstock using a paddle mixer in a 5-gallon plastic pail. The wet biomass was dried in an oven at 50° C. for about 5 days, with frequently turning and homogenizing, to obtain a biomass with less than 8 wt % of moisture content.

Figure 18:
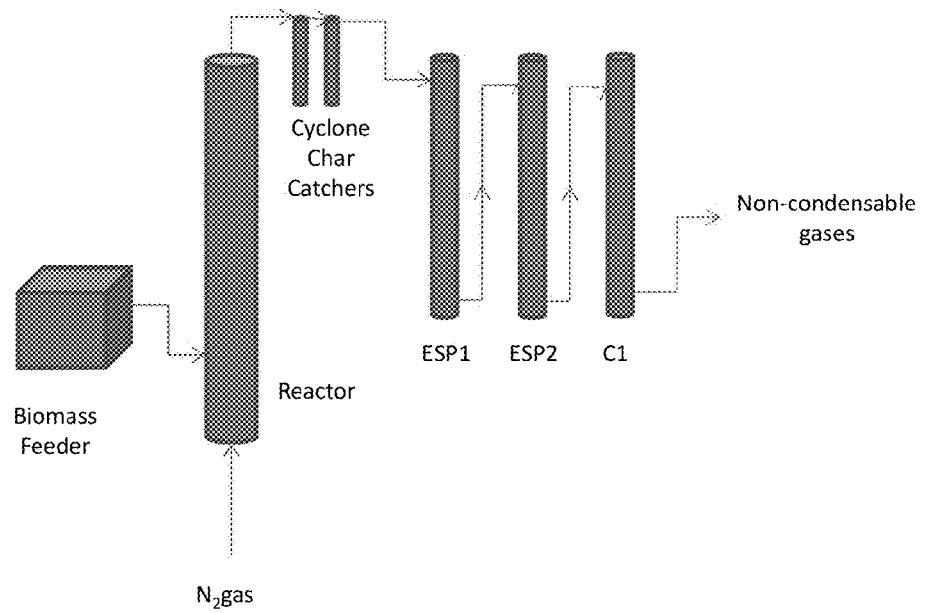
FIG. 18 is a schematic drawing showing a fluid bed reactor and downstream bio oil recovery equipment. ESP: Electrostatic Precipitator; C: Condenser.

The bench-scale fluid bed reactor was a 150 g/hour fluid bed reactor with sand as the fluidizing medium (KASPERBAUER: THE EFFECTS OF BIOMASS PRETREATMENTS ON THE PRODUCTS OF FAST PYROLYSIS (Iowa State University, 2009), which is hereby incorporated by reference in its entirety). The reactor consisted of a standard 316-stainless steel tube, 0.30 m long, and 38.1 mm in diameter. See FIG. 18. The sand bed of about 100 g with an average particle size of about 0.512 mm was in the bottom of this main tube. The freeboard was sized to allow for approximately 0.5 seconds of residence time between the top of the bed to the cyclone entrance. The average nitrogen flow into the plenum was 8SLPM. Standard industrial grade nitrogen was used with less than 0.05% of contaminants. A distributor plate between the plenum and the main tube forced the nitrogen to enter the bed from the plenum with a uniform velocity profile. This aided in properly fluidizing the bed and suspended the sand bed in the reactor. A metal screen just above the distributor plate kept the sand from seeping through the holes when the reactor was not in operation. The feed system used an injection auger to transport biomass into the reactor. A nitrogen gas flow of 2SLPM was used to transport the biomass effectively. Nitrogen was also used as the inert gas to fluidize the bed. To avoid oxygen ingress into the system, the biomass feeder was pressurized to about 20 kPa. The bio-oil collection system used an electrostatic precipitator (ESP) and two condensers in series to produce three fractions of bio-oil separated on the basis of the dew point of their components.

Figure 19:
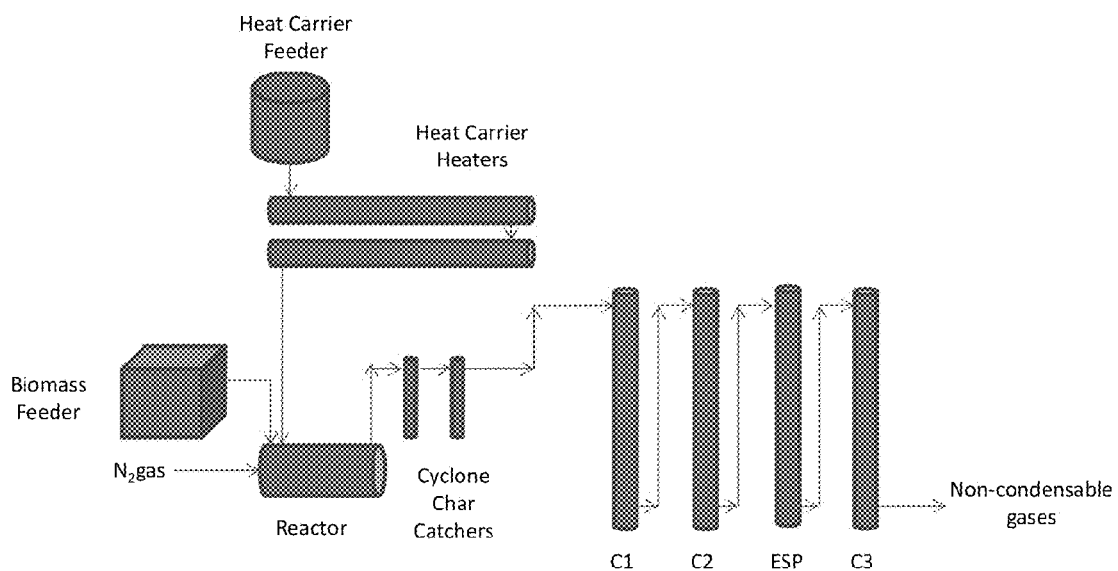
FIG. 19 is a schematic drawing showing an auger reactor and downstream bio oil recovery equipment. ESP: Electrostatic Precipitator; C: Condenser.

The bench-scale auger reactor was a 2.0 kg/hour reactor with steel shot of 0.5 mm nominal diameter as the heat carrier. See FIG. 19. The steel shot was fed from a feed hopper into a horizontally placed heated auger through flow control baffles. This auger discharged the shot into another horizontally placed heating auger below it. Two heated augers were used in order to reduce the space requirement of a very long auger. The heated augers were heated to the desired temperature using heat tape wound over them. The shot gained heat as it passed through the augers, and at the end reached the required temperature for pyrolyzing the biomass feedstock. The biomass feedstock was fed using an injection auger from a feed hopper. The reactor consisted of two augers rotating in opposite directions placed horizontally. The hot steel shot entered the reactor at one end from the top of the reactor, while the biomass feedstock entered from the side at the same end. The biomass mixed with the steel shot was pyrolyzed and transported to the other end where the steel shot and the char left the reactor and fell into a char catch. The heated augers, the biomass feed system, and the reactor were continuously flushed with nitrogen gas to avoid air infiltration. Further details of this reactor can be found in Pollard & Brown, *J. Anal. Appl. Pyrol.* 93:129-38 (2011), which is hereby incorporated by reference in its entirety.

The pyrolysis vapors formed in the reactor was swept by the nitrogen gas and flew out of the reactor through two cyclone separators configured in series and then into the condensers. The cyclones separated the char particles. Three condensers and an ESP, which was placed between condenser 2 and condenser 3, were used to collect the bio-oil in four different fractions based on their dew points. The first condenser was kept at a wall temperature of 60-65° C. while the second was kept at 10-15° C. The third condenser was an ice bath with wall temperature of about 0° C. The ESP was kept at room temperature that was between 20-25° C. The reactors were run at 500° C. for all the experiments in this example. A schematic drawing of a system of bio-oil fractionation and recovery system can be found in U.S. Pat. No. 8,476,480, issued on Jul. 2, 2013, which is herein incorporated by reference in its entirety.

Char from the auger type reactor was collected in a char catch along with the steel shot. Char was sieved out of the steel shot after the experiments. In some of the experiments, the char was in clumps along with the steel shot. Such char was ground first to separate the steel shot from the char, and then sieved. This process affected the accuracy of the char measurements, because the char did not separate well from the steel shot.

Sugars in the bio-oil samples were quantified using High Pressure Liquid Chromatography (HPLC) after acid hydrolysis.

Moisture was tested using Karl-Fischer titration equipment ASTM D6305. Acid numbers were determined using a modified acid number (MAN) method (Pollard & Brown, *J. Anal. Appl. Pyrol.* 93:129-38 (2011), which in hereby incorporated by reference in its entirety). Potentiometric titration with a Metrohm 798 Titrino was used to perform MAN analysis. The titrant was 0.1 M KOH in 2-propanol per ASTM D664. This modified ASTM D664 method used 75 ml methanol for the solvent with the bio-oil sample dissolved in 5 ml dimethylformamide (DMF) versus the ASTM D664 solvents: 50% toluene, 49.5% 2-propanol, and 0.5% water. The composition of the oil was analyzed using a Varian GC/MS. The method used was described in Pollard & Brown, *J. Anal. Appl. Pyrol.* 93:129-38 (2011), which in hereby incorporated by reference in its entirety. The structural composition of the feedstock was determined using the cell wall extraction method described in Examples 1-7.

A control feedstock of the untreated red oak and the acid-infused red oak were pyrolyzed separately on a bench-scale fluid bed reactor at 500° C. to produce bio-oils. The control feedstock was run at steady state for 3 hours.

Discussion of Example 8

A bio-oil yield of 67 wt % was obtained from a steady-state operation of the fluid bed for 3 hours using the untreated red oak as the control feedstock, with conditions shown in Table 6.

TABLE 6

Fluid-Bed Reactor Conditions for the Control Feedstock Run

| | |
|---|---|
| Bed temp | 500° C. |
| Feed rate | 150 g/hr |
| Condenser Configuration | ESP, ESP, Condenser |
| Duration of run | 3 hours |

Char and non-condensable gas yields from the control run on the fluid bed reactor were 13.2 wt % and 15.6 wt %, respectively, as shown in Table 7.

TABLE 7

Mass Balance of Red Oak Control Feedstock on the Fluid Bed Reactor

| | Yield (wt %) |
|---|---|
| Bio-Oil | 67.0 |
| Char | 13.2 |
| Gas | 15.6 |
| Difference | 4.2 |

Subsequently, the acid-infused feedstock was pyrolyzed in the same reactor. In the 3 hours the reactor was run, no major variation in the bed temperature was observed. The bio-oil yield was 45.1 wt % which was relatively low compared to the 67 wt % yield using the control feedstock. On inspection of the char catch and the reactor bed after the run, it was found that no char was collected in the cyclone char catchers; the entire char was stuck inside the reactor mixed with the fluidizing sand. As the reactor did not run at a steady state, the gas yield could not be calculated.

Figure 20:
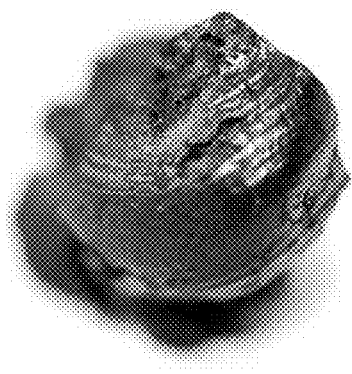
FIG. 20 is a photograph showing the vitreous material recovered from the fluid bed reactor after the pyrolysis of the acid-infused red oak.

On examining the char clumps recovered from the reactor, the shape of some of the clumps suggested that they were formed from solidification of molten material (FIG. 20). It was likely that the high amounts of sugars produced during pyrolysis as well as lignin were charred resulting in these clumps.

The control feedstock and the acid-infused feedstock had the same composition of cellulose, hemicellulose, and lignin. The large variation in the pyrolysis behavior of these feedstocks indicates that the mechanism of pyrolysis and the resulting composition of the bio-oil are different in each case. The yield of bio-oil was 45.1% from the acid-infused red oak compared to the yield of 67% from the control red oak feedstock. It was observed that bio-oil was collected at a good rate in the first half an hour of the run, which gradually decreased to virtually zero. It is possible that, as the agglomeration of char progressed, the pyrolyzate passing through it underwent further secondary reactions to form more char, water, and non-condensable gases, as indicated by the low yield of bio-oil.

It was hypothesized that the polymerization of levoglucosan or the failure of acid-infused lignin to depolymerize caused the operational problems in the fluid bed reactor. To overcome the char agglomeration problem, an auger type reactor was chosen to pyrolyze the acid-infused feedstock. In the auger type reactor, the heat carrier and the feedstock are physically moved by the rotating auger from one end of the reactor to the other, by which the char formed in the reactor can be continuously removed from the reactor. Therefore, charring of lignin and sugars will not affect the pyrolysis of the fresh biomass.

Experiments with the control and the acid-infused red oak were carried out on the auger-type pyrolysis reactor. The reactor was first operated with the control feedstock (an untreated red oak) to obtain a base-line performance with a steel shot feed rate of 10 kg/hour, a biomass feed rate of 1.0 kg/hour, and a sweep gas flow rate of 3 LPM. The reactor temperature was 500° C. The oil yield was 65 wt %, which was normal. The oil analysis showed that the moisture content of the oil was 28.4 wt % which was normal. This could be due to the lower degree of pyrolysis of lignin in the biomass. The conversion of the biomass to sugars was 4.7 wt %, which was very close to conversions obtained in microscale pyrolysis trials (4-6 wt %).

With the reactor operating normally, the pretreated red oak feedstock was run with the same conditions of the heat carrier, biomass feeding rates and sweep gas flow rate as the previous run on the control. However, the reactor was clogged after about 30 minutes of run. On inspection, it was found that the steel shot down-corner into the reactor was clogged with the unreacted biomass. This could be due to the inadequate amount of the heat carrier to pyrolyze the pretreated biomass both in terms of the energy requirement and volume.

Taking the conditions of the previous tests into consideration, another pyrolysis test was carried out with the same flow rate of the heat carrier, but with a 0.5 kg/hour feed rate of biomass, while the sweep gas flow was unaltered. The reactor ran at a steady state to produce a good yield of bio-oil; however, clumps similar to that found in the fluid bed were observed in the char catch. It was found that molten material was solidifying along with the steel shot. The yield of sugars improved marginally to 6.0 wt % of the biomass, which was a 1.5 wt % improvement over the control red oak. This result suggests that most of the sugars formed during pyrolysis may have been charred in the reactor.

It was further hypothesized that creating the right conditions for the feedstock to pyrolyze very fast and also for the very fast removal of the pyrolyzate from the reactor were essential for producing sugars from the pretreated biomass. It was found that the vapor pressure of the anhydrosugars inside the reactor is a deciding factor in oligomerizing them and subsequently charring (Kawamoto et al., *J. Anal. Appl. Pyrol.* 85:247-51 (2009), which is hereby incorporated by reference in its entirety).

In a subsequent test, to reduce the vapor pressure of levoglucosan inside the reactor during pyrolysis, the biomass feed rate was reduced to 0.25 kg/hour and the sweep gas flow rate was increased to 4 LPM. All the temperatures and heat-carrier feed rates were kept the same as that from the previous tests. The reactor ran at a steady state and produced a bio-oil at a yield of 66 wt %. Fewer clumps of char were found compared to the previous tests. The overall sugar yield was 17 wt % on a biomass basis, which was very close to that obtained from the fluid bed reactor. This experiment proved that sugars can be produced from the acid-infused biomass on an auger reactor with desirable conditions.

Because of the large increase in sugar yields from the acid-infused red oak on the auger reactor after reducing the vapor pressure, the sweep gas flow was further increased to 5 LPM. The sugar yield in this case decreased from that of the previous run to 12.3 wt %. This result could be due to the higher flow of sweep gas suspending the biomass particles in the gas, thereby reducing the contact between the heat carrier and the biomass. In the auger reactor, the biomass particles are required to mix with the heat carrier to result in good pyrolysis. Further, the run with 10 kg/hour of heat carrier, 0.25 kg/hour of biomass feed rate, and 4 LPM of the sweep gas was replicated with the control red oak and the acid-infused red oak. They produced repeatable results with sugar content of 17 wt % on biomass basis.

The results of the pyrolysis of control feedstock and acid treated feedstocks are shown in Table 8.

TABLE 8

Pyrolysis Conditions and Mass Balances of the Control and the Acid-Treated Red Oak

| | Conditions | | | |
|---|---|---|---|---|
| | 10 kg shots 0.25 kg biomass 4 LPM N2 | 10 kg shots 0.25 kg biomass 4 LPM N2 | 10 kg shots 0.25 kg biomass 4 LPM N2 | 10 kg shots 0.25 kg biomass 4 LPM N2 |
| | Feedstock | | | |
| | Red Oak Control | Red Oak Control | Red Oak 0.4 wt % H2SO4 | Red Oak 0.4 wt % H2SO4 |
| Bio-Oil (wt %) | 68.7 | 65.3 | 65.6 | 65.0 |
| Gas (wt %) | 20.2 | 20.2 | 14.2 | 12.0 |
| Char (wt %) | 20.0 | 13.1 | 7.1 | 6.5 |
| Mass closure | 108.8 | 98.5 | 86.9 | 83.4 |
| Bio-Oil in Fractions | % oil | % oil | % oil | % oil |
| C1 | 65.2 | 52.8 | 54.6 | 55.1 |
| C2 | 3.2 | 14.5 | 5.1 | 5.1 |
| ESP | 28.3 | 29.5 | 37.2 | 37.4 |
| C3 | 3.2 | 3.1 | 3.1 | 2.4 |
| Total Oil | 100.0 | 100.0 | 100.0 | 100.0 |
| Biomass Fed (g) | 287.4 | 317.1 | 442.0 | 269.7 |
| % yield | 68.4 | 65.2 | 65.6 | 65.0 |
| % yield of sugars | 4.7 | 5.2 | 17.9 | 16.9 |

It can be seen that the bio-oil yields were very good at about 65 wt % and were comparable in the case of both the control and the acid-treated feedstocks. On the other hand, there was marked decrease in the non-condensable gases yield of about 7 wt %. When the AAEMs are passivated, the depolymerization of the carbohydrate chains is promoted which will reduce the formation of compounds with lower molecular weight. Also, the AAEMs are known to promote char and gas formation (Pan & Richards, *J. Anal. Appl. Pyrol.* 16(2):117-26 (1989), which is hereby incorporated by reference in its entirety). Their passivation should reduce char and gas formation. The char yield for the acid-treated feedstocks was much lower than that from the control feedstock. However, it can be difficult to obtain clear inferences from these results, because of the inherent error in the char measurement described in Example 8. The unaccounted mass is very likely to be in the char, in which case, the char formed will be very similar in the cases of the control and the acid-infused feedstocks. The char contained clumps formed along with the steel shot. There was a possibility of increased char formation from the lignin portion of the biomass, and at the same time, decreased char formation from the cellulose and hemicellulose. This phenomenon may explain similar yield of char and decreased yield of gases in the case of the test feedstock.

The oils produced from control red oak and acid-infused red oak on the auger reactor were tested for important physico-chemical properties such as sugar content, moisture content, TAN (MAN), water insolubles, and composition. The results are discussed below:

Sugars

Figure 21:
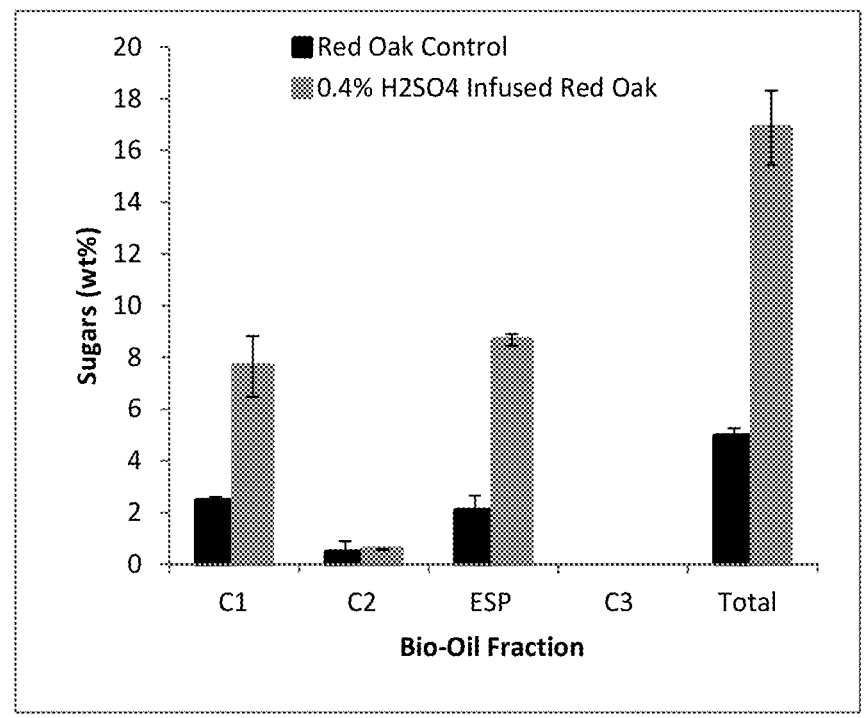
FIG. 21 is a graph showing the sugar content of the bio-oil fractions from the control and the acid-infused red oak. C: Condenser; ESP: Electrostatic Precipitator.

Sugars in the bio-oils were distributed in the first three stage fractions. The overall sugar yield from pyrolysis of the control red oak was 5 wt % while the one from the acid-infused red oak was 17 wt %. As can be seen from FIG. 21, the sugars were distributed in the bio-oil fractions in varying amounts. The first and third fractions contained almost equal amounts of sugars in both the cases of control and the acid-infused feedstock. The first condenser condensed the sugars while the electrostatic precipitator (ESP) collected most of the aerosols of sugars and lignin-derived oligomers. The second fraction from both the feedstocks contained very little sugars, as lowering the temperature was not sufficient to condense the sugar precursors (probably anhydrosugars). The results indicate the potential of collecting most of the sugars in one fraction of the bio-oil by optimizing the condenser/ESP system, which will make further processing of these sugars easier. It can be seen that by using the acid-infused feedstock, the overall sugar yield was increased by 240% from that from the untreated biomass. This process illustrates the potential for producing sugars from fast pyrolysis of biomass feedstocks.

Moisture

Figure 22:
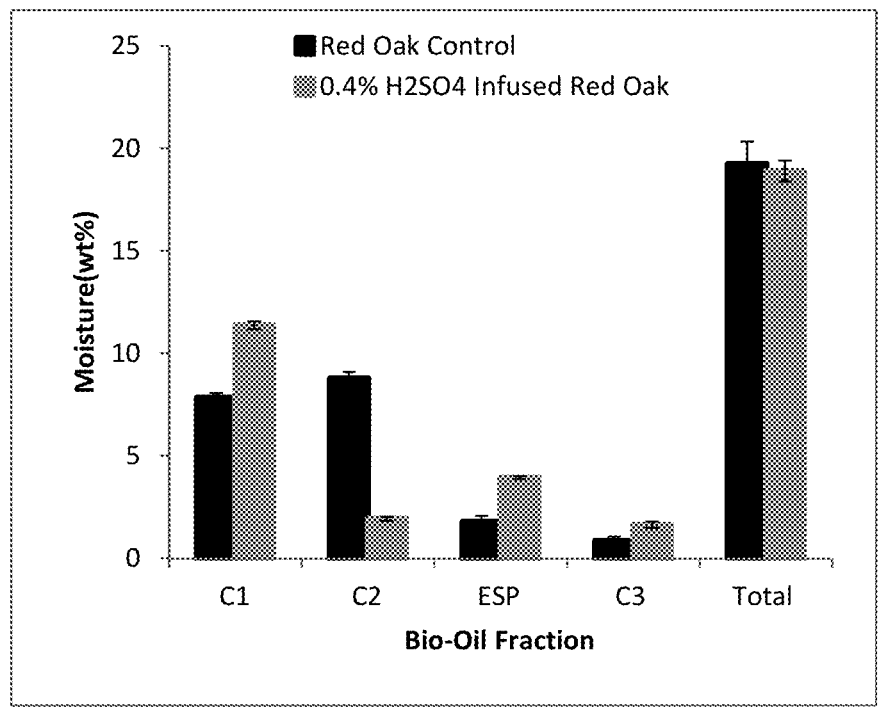
FIG. 22 is a graph showing the moisture content of the stage fractions of bio-oils normalized to total bio-oil weight from the control and the acid-infused red oak. C denotes condenser and ESP denotes the Electrostatic Precipitator.

The bio-oil from the control feedstock had a total moisture content of 19.3 wt % while the acid-infused had 18.9 wt % on a biomass weight basis. With the passivation of alkali, the alkali catalyzed ring and char formation should decrease the water content of the bio-oil. The results show that the moisture content of the bio-oils from both the untreated and acid-infused red oak were almost the same. This result suggests that though there was a marked difference in the pyrolysis of the carbohydrates, the increased char formation caused more water formation from lignin and parts of carbohydrates. Though they are almost equal, the distribution of the moisture into the bio-oil fractions is different in each case. See FIG. 22. The moisture content of C1 and ESP increased while that of C2 decreased, when compared to the control feedstock. It is possible that the sugars were absorbing moisture that caused the increase in moisture contents of the first and third fractions that contain most of the sugars.

Modified Acid Number (MAN)

The acid infusion passivates the AAEM in the biomass feedstock and drives the pyrolysis reaction through the depolymerization pathway thereby increasing the sugars yield and decreasing the yield of light oxygenates that include carboxylic acids. Hence, a reduction in acidity is expected in the case of the bio-oil from the acid-infused feedstock.

Figure 23:
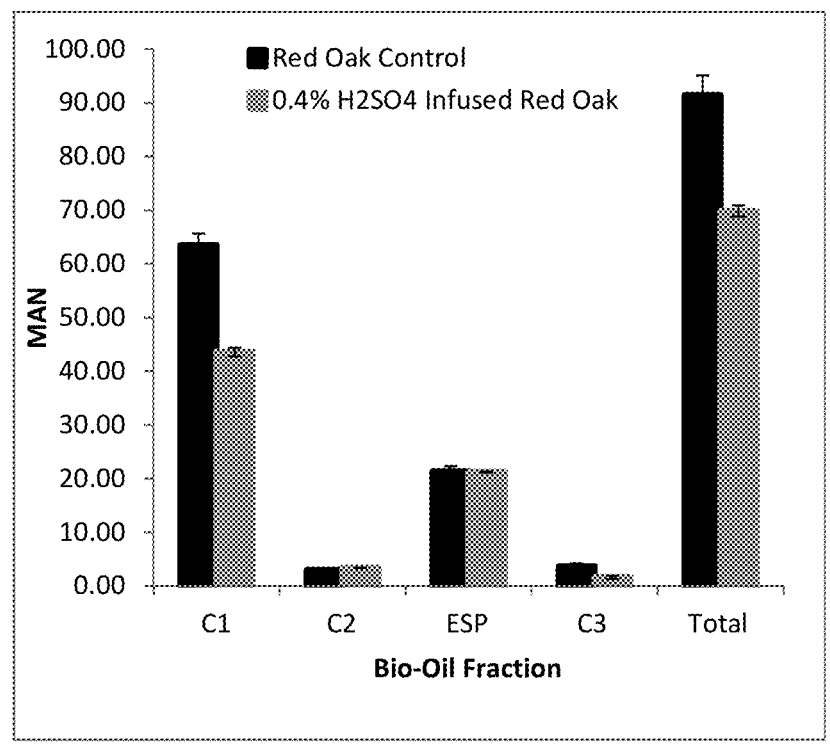
FIG. 23 is a graph showing the modified acid number (MAN) of the stage fractions of bio-oils from the control and the acid-infused red oak. C: Condenser; ESP: Electrostatic Precipitator.

As can be seen from FIG. 23, the MAN of the first and fourth fractions, decreased significantly. Maximum reduction is in the case of the first fraction because of the large quantity of this fraction. Fraction 4, which is comprised mostly of acidic compounds, dropped its acidity considerably. The overall MAN of the bio-oil from the acid-infused feedstock was 71 when compared to 91 of the bio-oil from control feedstock, which is a 21% decrease. This decrease in the acidic products content of the bio-oil with test feedstock supports the hypothesis that the pyrolysis reaction favors the depolymerization pathway to ring fragmentation pathway when the AAEMs are passivated by the acid infusion.

Water Insolubles

Figure 24:
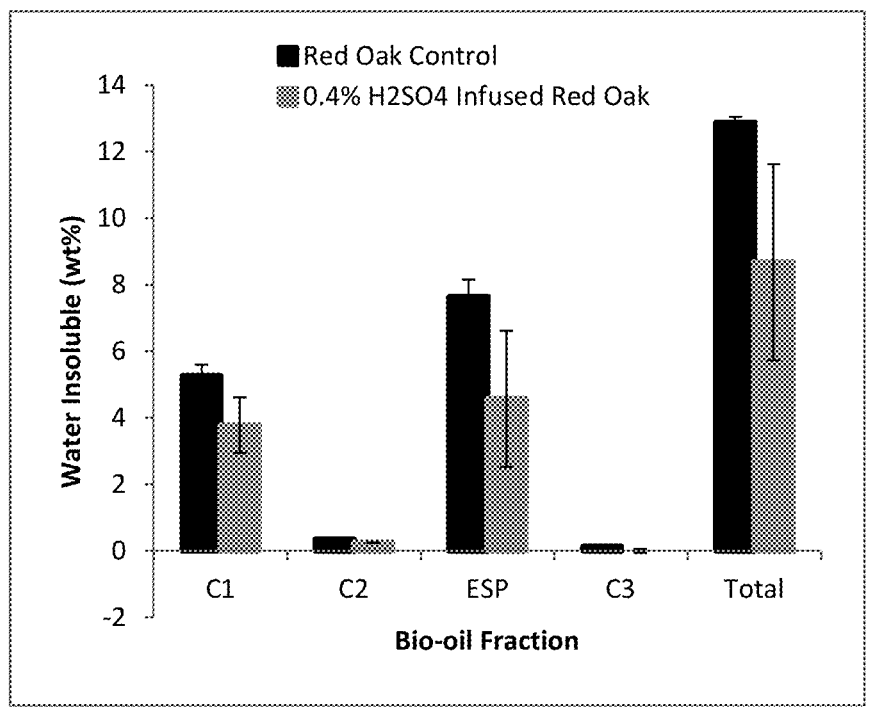
FIG. 24 is a graph showing the content of water insolubles of the stage fractions of bio-oils from the control and the acid-infused red oak. C: Condenser; ESP: Electrostatic Precipitator.

As shown in FIG. 24, the water-insoluble content decreased in the case of the acid-infused red oak when compared to the control. The insolubles decreased from 10.7 to 4.8 wt % in the case of SF2, and from 25.6 to 16.2 wt % in the case of SF3, which resulted in an overall decrease from 12.7 to 10.8 wt %. As was discussed earlier, this decrease can be attributed to the possibly incomplete pyrolysis of lignin in the acid-infused red oak.

GC/MS Analysis

Figure 25:
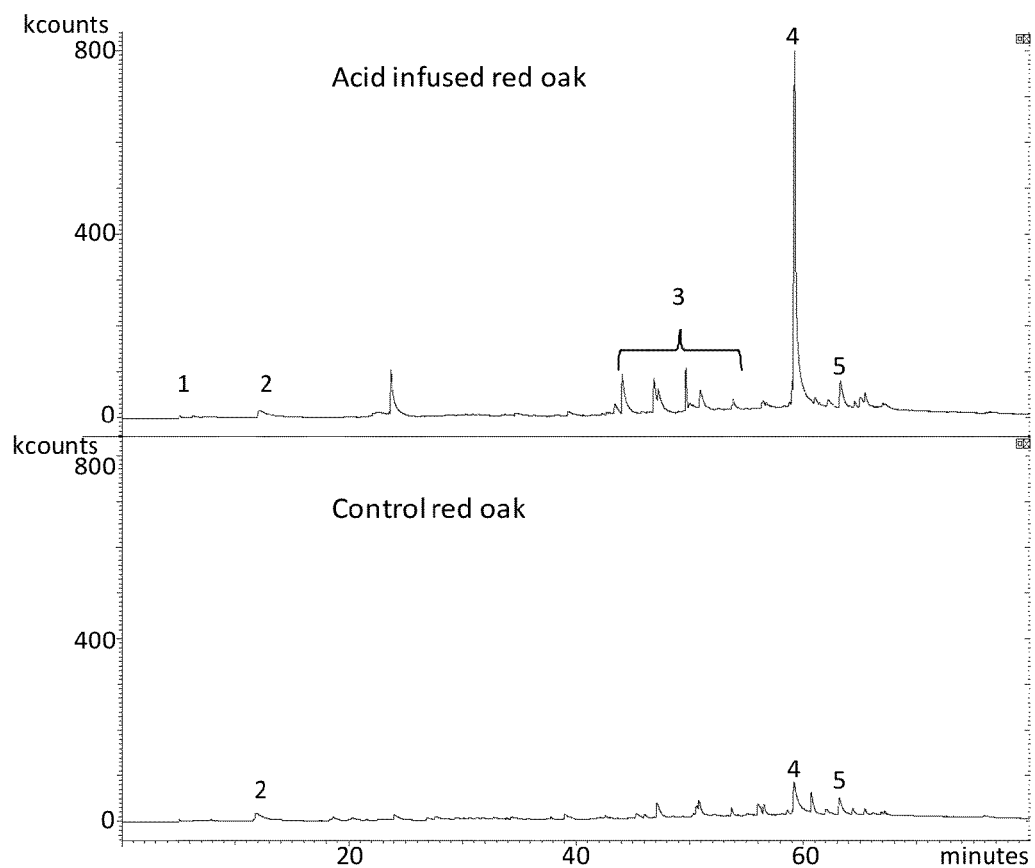
FIG. 25 shows the GC-MS chromatograms of SF3 from the control and the acid-infused red oak: 1. glycol aldehydes dimethyl acetal; 2. acetic acid; 3. other anhydrosugars; 4. levoglucosan; and 5. phenanthrene (internal standard).

All four bio-oil fractions from the control feedstocks and the acid-infused feedstocks were analyzed for their compositions using a GC/MS. As shown in FIG. 25, the fraction from condenser 3 from the acid-infused feedstock contained a very large amount of sugar when compared to that from the control feedstock. The levoglucosan peak is the largest one in the chromatogram of the acid infused feedstock. Although the levoglucosan peak is the most prominent peak in the control, it is much smaller than that of the acid infused. In both the samples, the acetic acid peak is not significant. Also, there are significant peaks of other anhydrosugars in the acid-infused red oak, which are totally missing from the control chromatogram.

Figure 26:
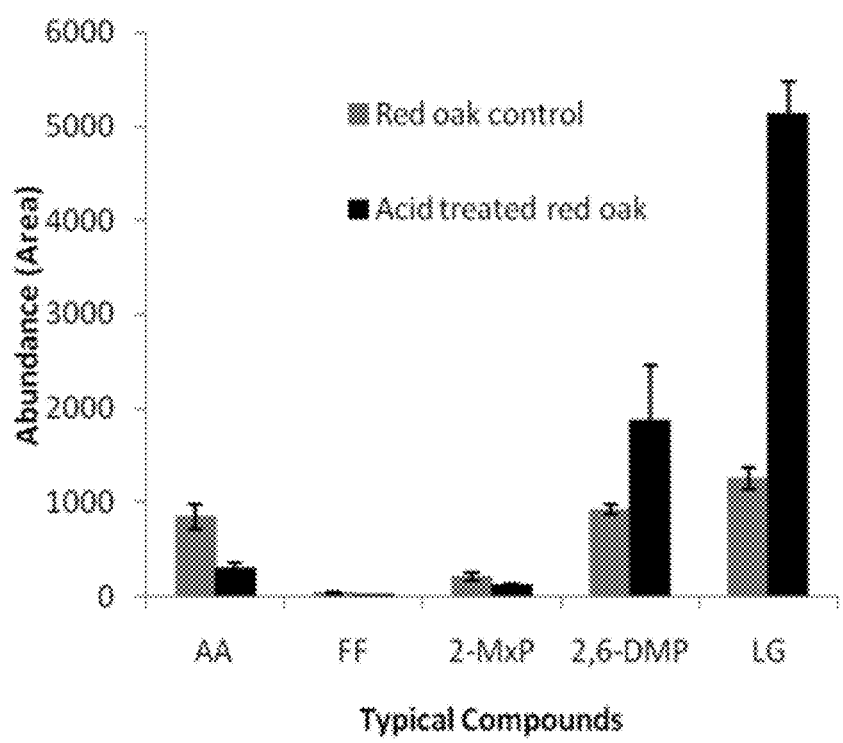
FIG. 26 shows the GC/MS abundance in terms of peak areas for typical compounds. AA: acetic acid; FF: furfural; 2-MxP: 2-methoxy phenol; 2,6-DMP: 2,6-dimethoxy phenol; and LG: levoglucosan.

The abundance of five of the typical compounds from four important categories of compounds contained in bio-oil was obtained from the GC/MS spectra. The weighted average abundance from each fraction of the bio-oil was added to obtain the abundance of a compound in the whole bio-oil. The comparison between the bio-oils from the control and the acid-infused feedstocks is shown in FIG. 26. It can be seen that with the infusion of an acid, the yield of levoglucosan increased by about four-fold, while the yield of acetic acid decreased to a third. This result clearly supports the hypothesis that the acid infusion passivates the AAEM and drives the pyrolysis reactions predominantly through the depolymerization pathway. Increase in the yield of furfural was anticipated because of the possible dehydration of sugars that the mineral acid can cause. However, there was no significant change in furfural yield in this case.

A thermochemical process was developed to increase the yield of sugars from pyrolysis of biomass feedstocks. It was demonstrated that the acid-infused red oak yielded 240% more sugars than the untreated feedstock. Fluidized bed type of reactor may not be suitable to carry out the pyrolysis of acid-infused feedstocks, because the process may not be run at a steady state, though a very high yield of sugar was obtained using this reactor. On the other hand, an auger type pyrolysis reactor with desirable operating conditions was found to be suitable to produce bio-oils with a very high yield of sugar. The overall sugar yield of 17% achieved from red oak corresponds to 40% of cellulose conversion into sugars. The chemical analysis results of the bio-oils support the AAEM passivation hypothesis. This process offers excellent prospects to produce sugars from biomass feedstocks that could be upgraded to drop-in transportation fuels.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. A method for pretreating lignocellulosic biomass containing alkali and/or alkaline earth metal (AAEM) comprising:
    providing a lignocellulosic biomass containing AAEM;
    determining the amount of the AAEM present in the lignocellulosic biomass;
    identifying, based on said determining, the amount of a mineral acid sufficient to titrate the AAEM present in the lignocellulosic biomass and to completely convert the mineral acid and the AAEM in the lignocellulosic biomass to thermally-stable, catalytically-inert salts without requiring residual acid disposal; and
    treating the lignocellulosic biomass with the identified amount of the mineral acid to produce a treated lignocellulosic biomass containing thermally-stable, catalytically inert AAEM salts, wherein said method does not remove the catalytically-inert AAEM salts from the lignocellulosic biomass.

2. The method of claim 1 further comprising:
    drying the treated lignocellulosic biomass.

3. The method of claim 1 further comprising:
    pyrolyzing the treated lignocellulosic biomass to obtain a bio-oil product.

4. The method of claim 3, wherein the obtained bio-oil product comprises anhydrosugars, monosaccharides, and oligosaccharides.

5. The method of claim 3, wherein the sugar yield in the bio-oil product is increased by 2-9 fold compared to a bio-oil product produced from the provided lignocellulosic biomass which is not subjected to said treating.

6. The method of claim 3, wherein the bio-oil product has a sugar yield of 18-25 wt % compared to a bio-oil product produced from the provided lignocellulosic biomass which is not subjected to said treating having a sugar yield of only 2-6 wt%.

7. The method of claim 3, wherein the bio-oil product has a light oxygenated compound yield which is decreased by 8-15 wt % compared to a bio-oil product produced from the provided lignocellulosic biomass which is not subjected to said treating.

8. The method of claim 3, wherein said pyrolyzing is carried out at a temperature ranging from 300° C. to 500° C.

9. The method of claim 1, wherein the lignocellulosic biomass is selected from the group consisting of softwood, hardwood, grasses, crop residues, and mixtures thereof.

10. The method of claim 1, wherein the molar concentration of AAEM salts in the acid-treated lignocellulosic biomass ranges from 0.065 to 0.40 mmol per gram of biomass.

11. The method of claim 1, wherein said treating is carried out with 0.04 to 0.50 mmol mineral acid per gram of biomass.

12. The method of claim 1, wherein the mineral acid is sulfuric acid, phosphoric acid, or hydrochloric acid.

13. The method of claim 3, wherein said pyrolyzing is carried out in a continuous flow reactor.

14. The method of claim 3, wherein said pyrolyzing is carried out in an auger-type reactor.

15. The method of claim 14, wherein said pyrolyzed bio-oil from the auger-type reactor product comprises 15-30 wt% sugar.

* * * * *